May 30, 1944.  H. M. LUCAS ET AL  2,350,174
BORING MACHINE
Filed Dec. 2, 1938  16 Sheets-Sheet 5

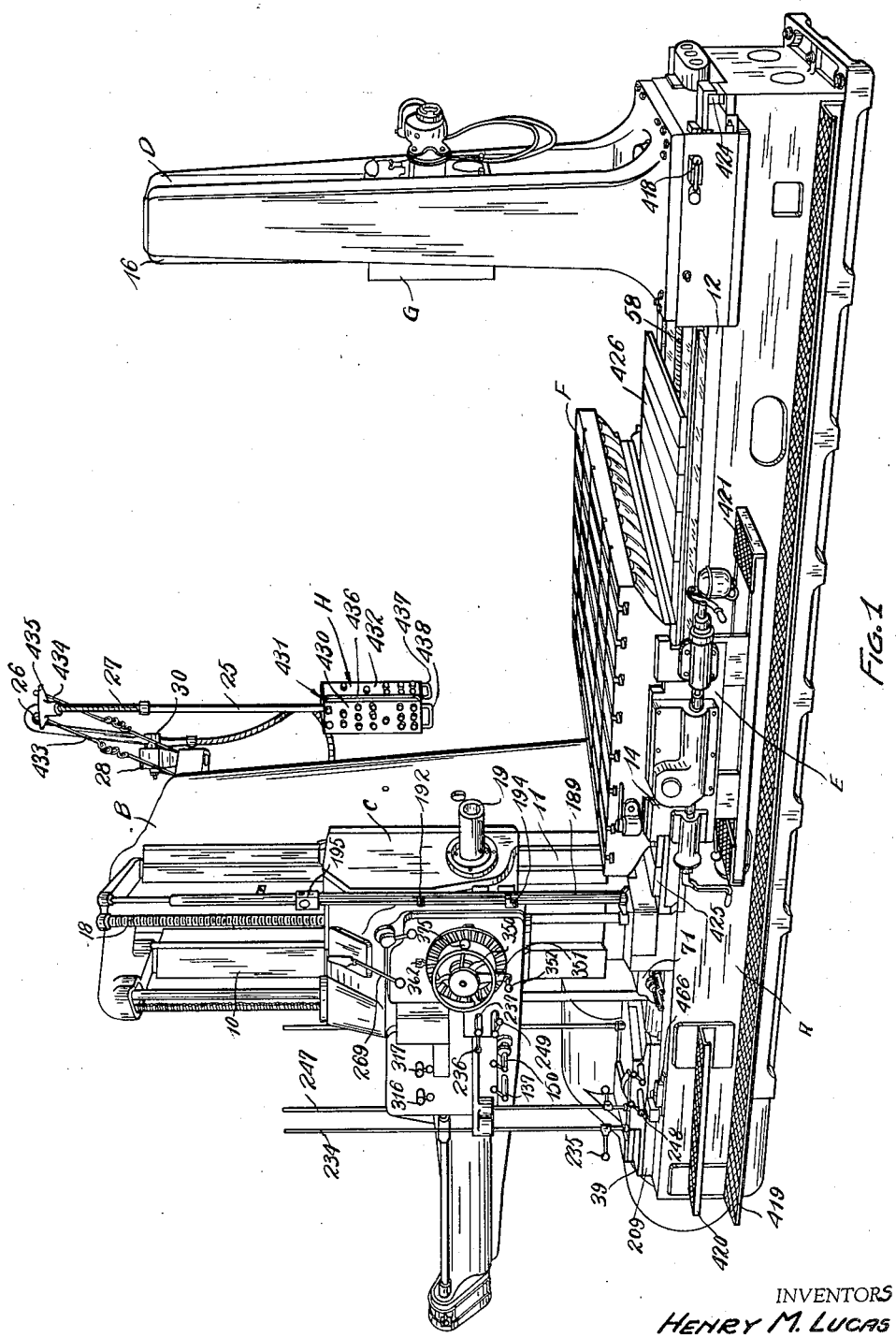

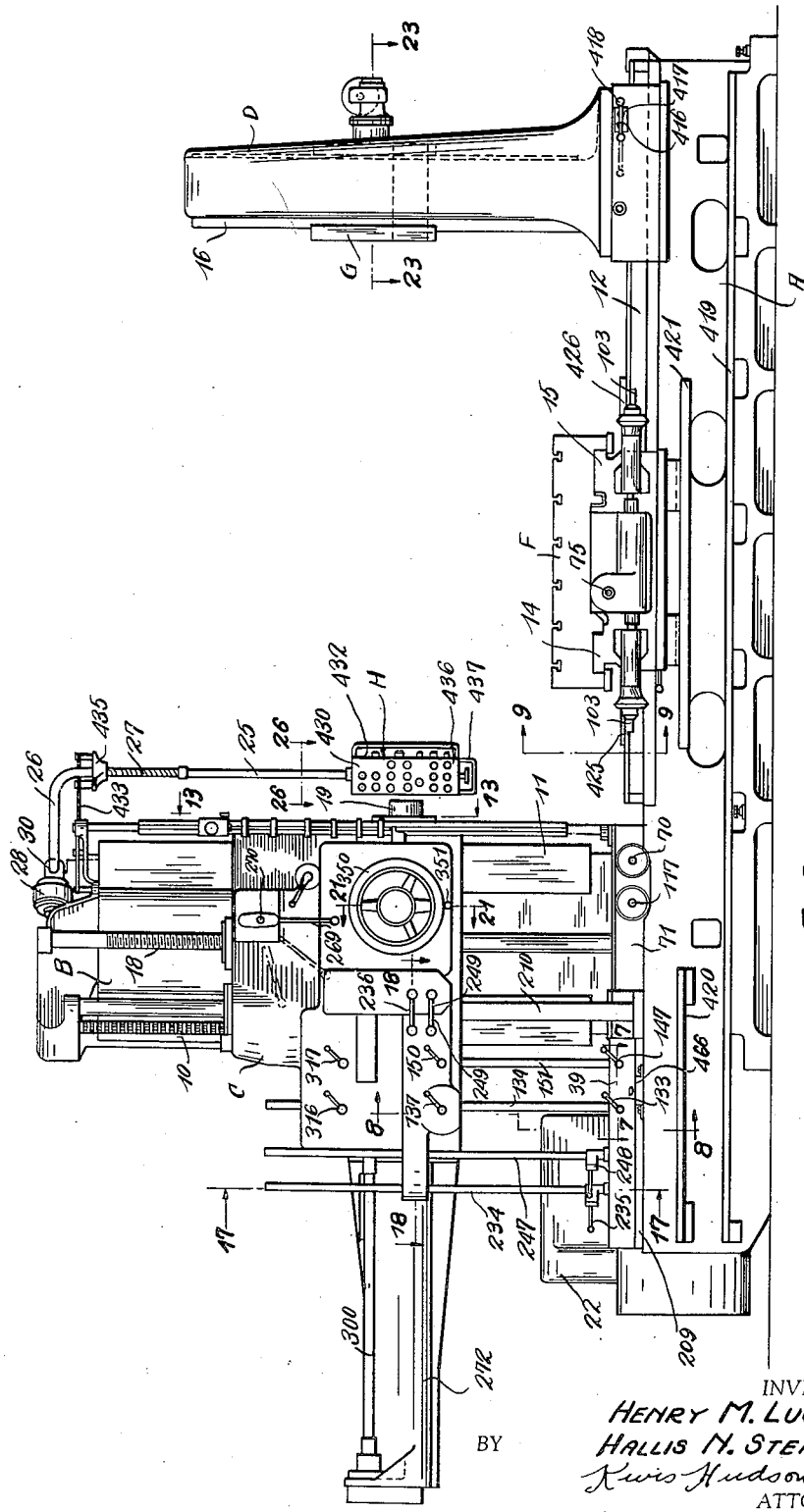

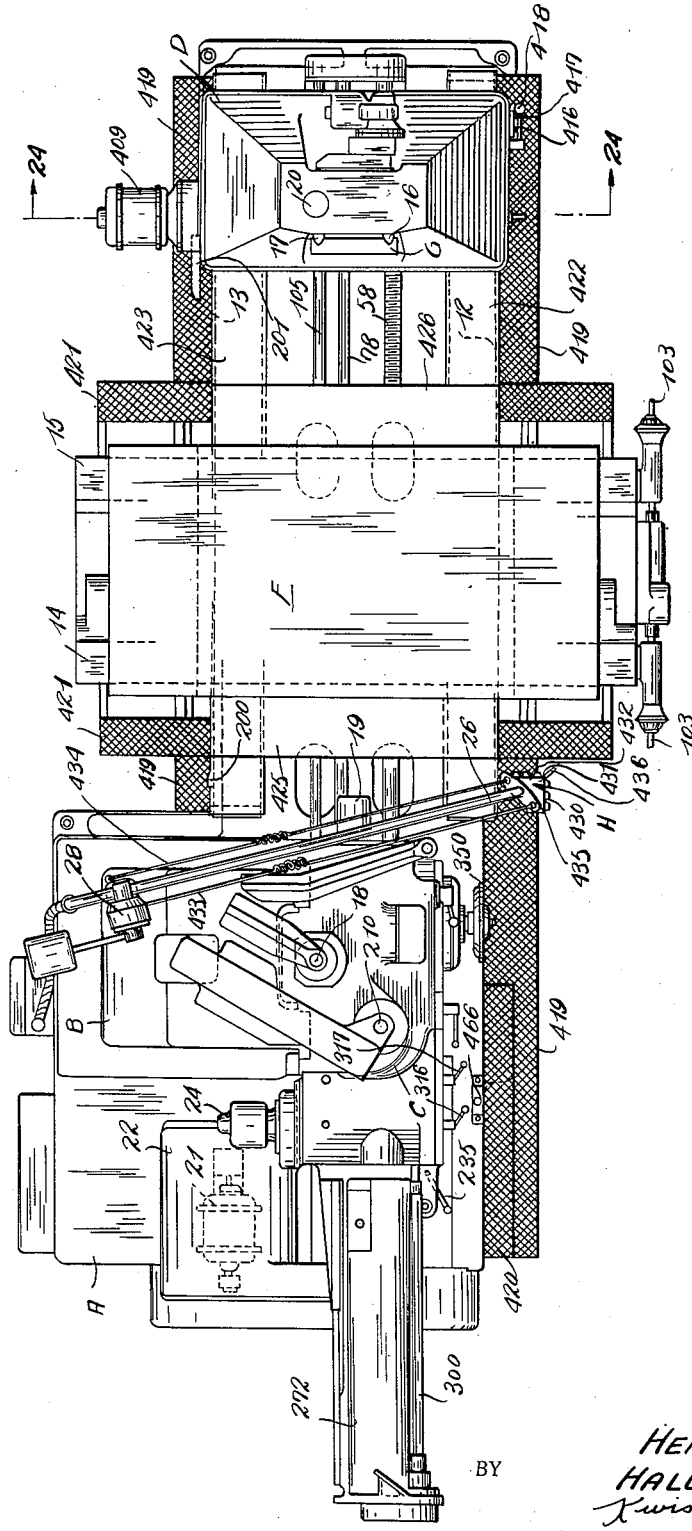

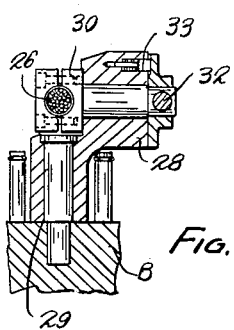
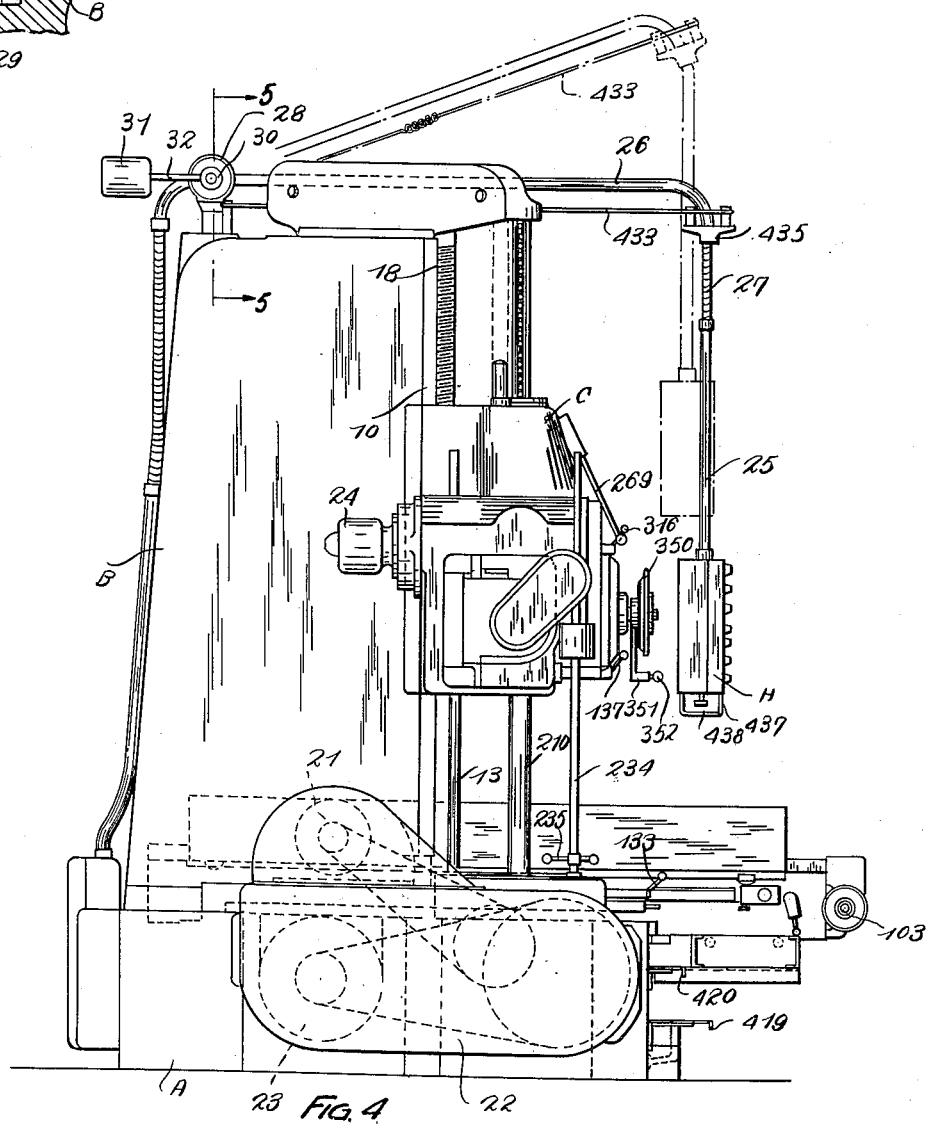

INVENTORS
HENRY M. LUCAS
HALLIS N. STEPHAN
BY Lewis Hudson&ent
ATTORNEYS

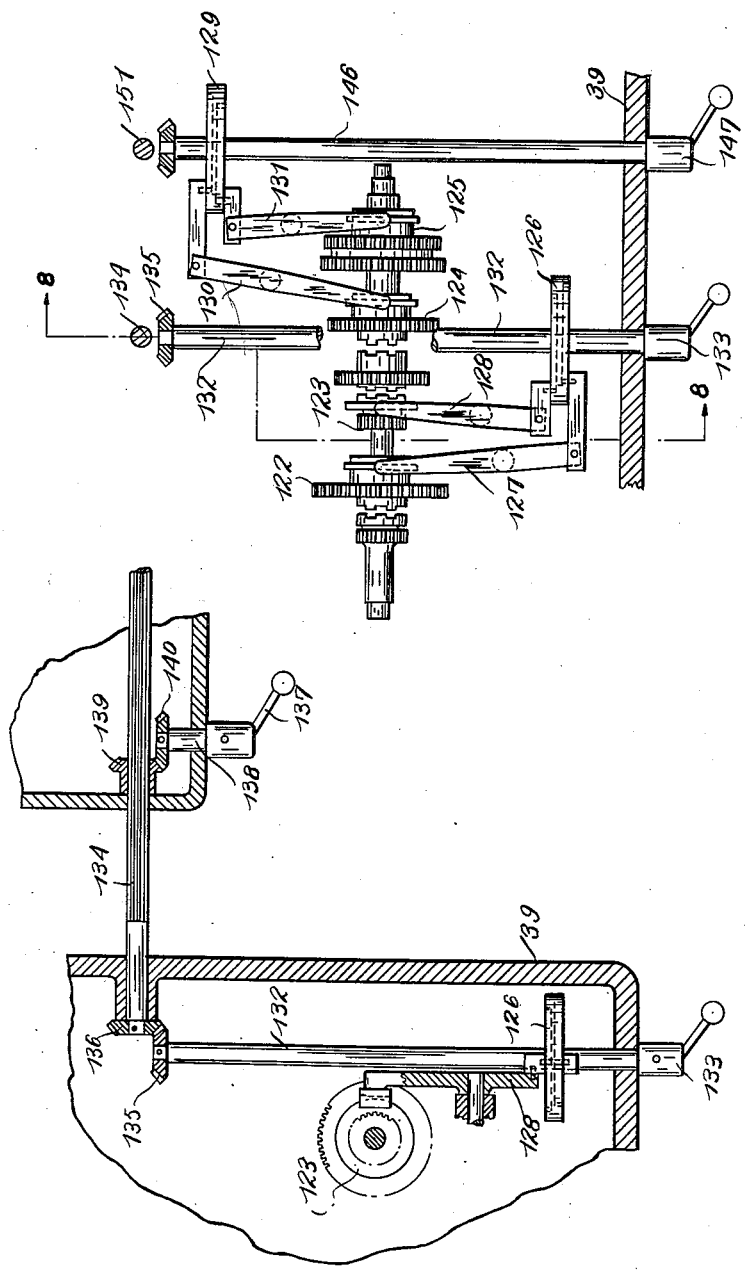

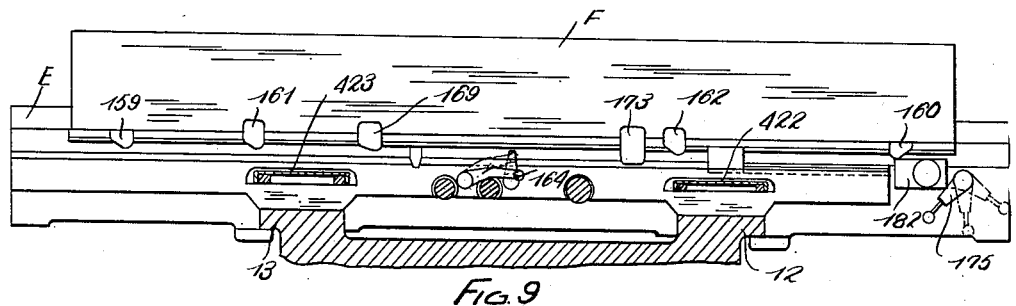
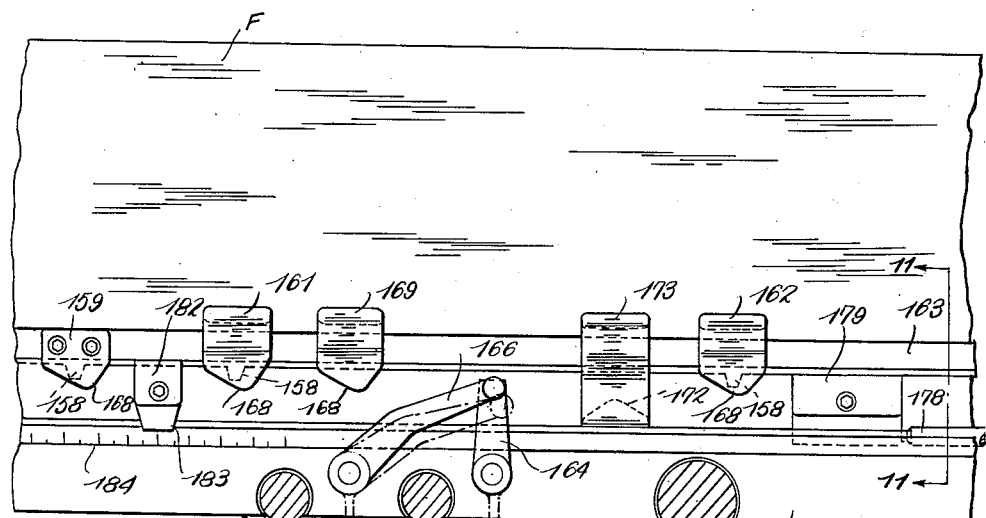
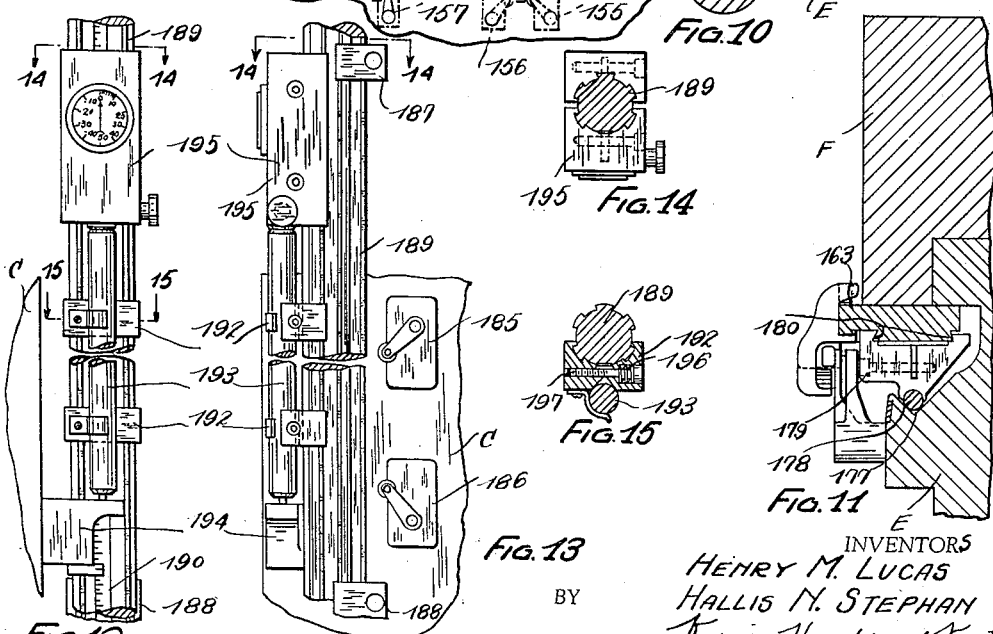

May 30, 1944.    H. M. LUCAS ET AL    2,350,174
BORING MACHINE
Filed Dec. 2, 1938    16 Sheets-Sheet 8
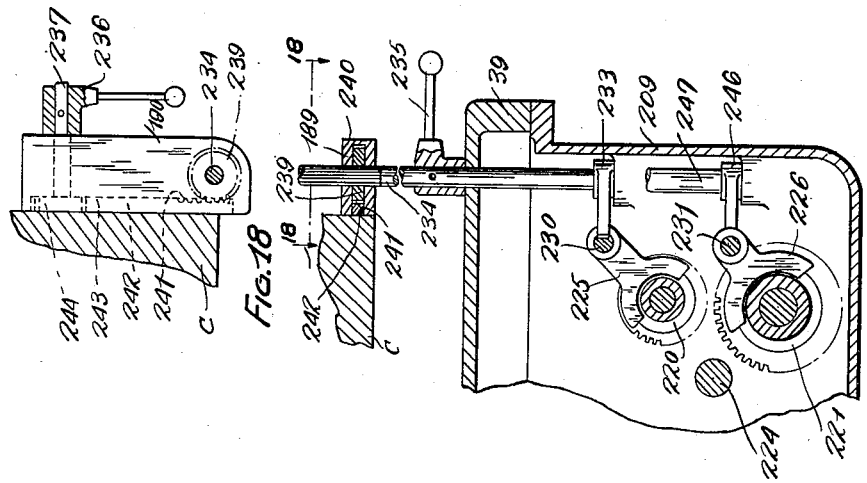
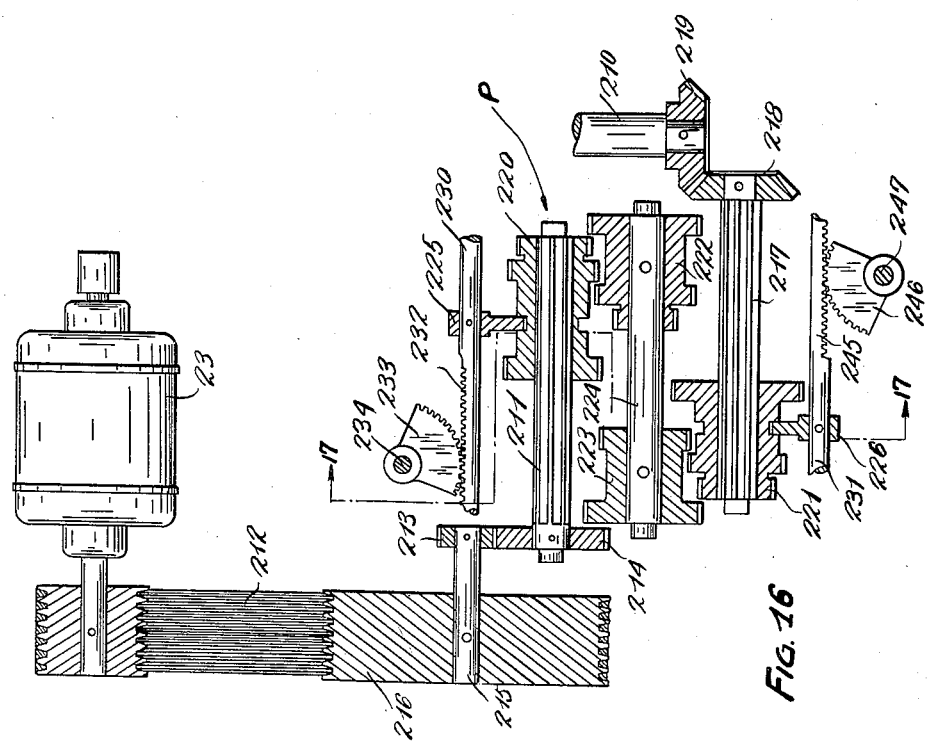
INVENTORS
HENRY M. LUCAS
HALLIS N. STEPHAN
BY  Kwis Hudson & Kent
ATTORNEYS

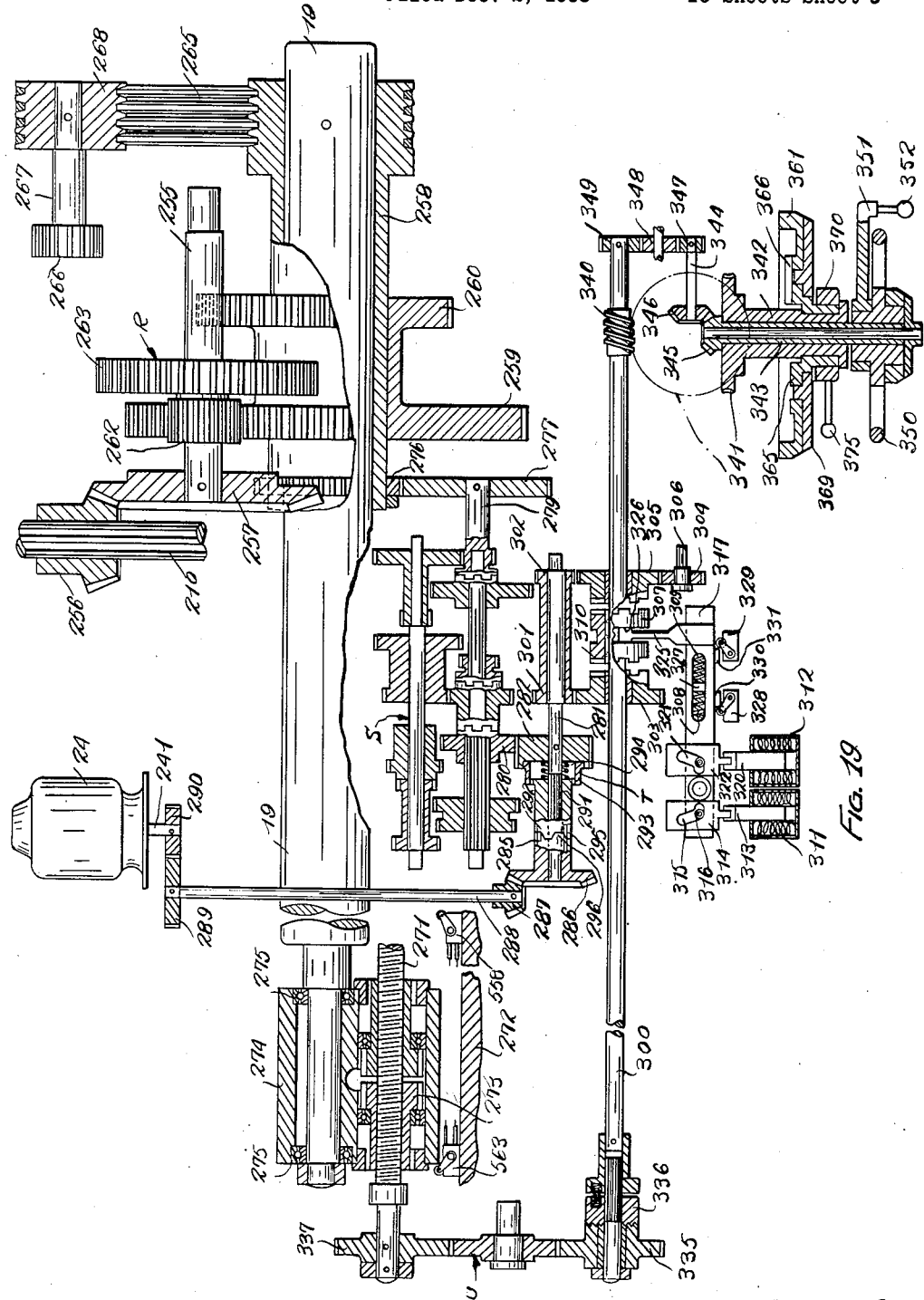

May 30, 1944.  H. M. LUCAS ET AL  2,350,174
BORING MACHINE
Filed Dec. 2, 1938  16 Sheets-Sheet 10

INVENTORS
HENRY M. LUCAS
HALLIS N. STEPHAN
BY Kwis Hudson Kent
ATTORNEYS

May 30, 1944.  H. M. LUCAS ET AL  2,350,174
BORING MACHINE
Filed Dec. 2, 1938  16 Sheets-Sheet 11

INVENTORS
HENRY M. LUCAS
HALLIS N. STEPHAN
BY Kwis Hudson & Kent
ATTORNEYS

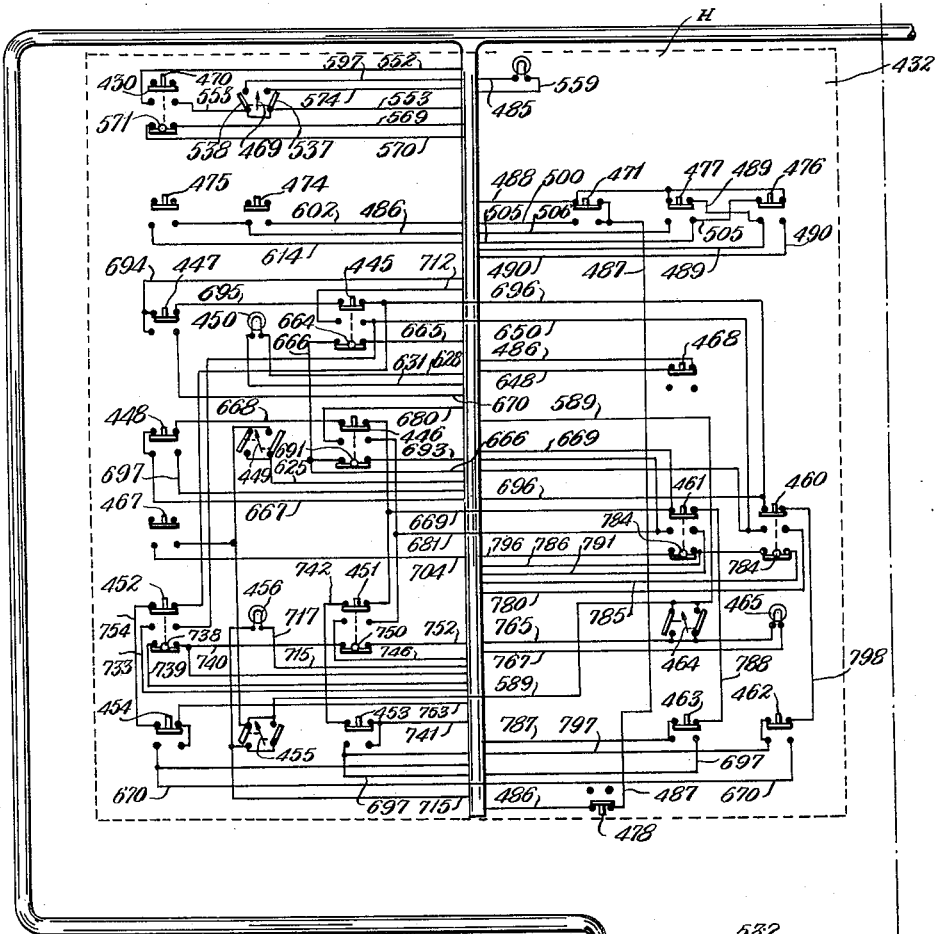
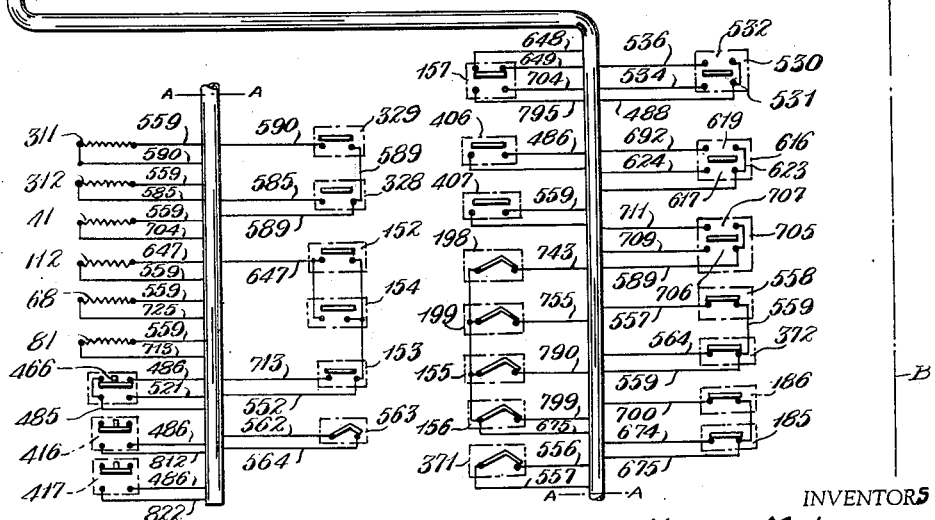
FIG. 29

Patented May 30, 1944

2,350,174

UNITED STATES PATENT OFFICE 2,350,174

BORING MACHINE

Henry M. Lucas and Hallis N. Stephan, Cleveland Heights, Ohio, assignors, by mesne assignments, to The Lucas Machine Tool Company, Bratenahl, Ohio, a corporation of Ohio Application December 2, 1938, Serial No. 243,616

42 Claims. (Cl. 29—26)

The present invention relates to machine tools and more particularly to horizontal boring machines.

Machines of the character referred to usually comprise a work table slidably supported on a saddle for movement transversely of a horizontal tool spindle rotatably supported in a tool spindle head slidably supported for vertical movement on a head column fixed to one end of the bed. The saddle which carries the work table is in turn slidably supported on the bed for movement at right angles to the movement of the work table, and the end of the bed other than the end which carries the head column is provided with a column carrying a back rest block.

Prior to the present invention it was universal practice to locate the various controls for effecting the different movements of the table, saddle, spindle head, etc., on the spindle head, and/or the base. In these positions the controls were not always within convenient reach of the operator who was often required to manipulate the controls without being able to see the tool, etc. This was especially true with reference to machines of the larger sizes.

The principal object of the present invention is the provision of a novel and improved boring machine of the character referred to, the various movements and/or operations of which can be controlled or effected from any convenient part of the machine, thus permitting the operator a clear view of the tool and work at all times.

Another object of the present invention is the provision of a novel and improved boring machine of the character referred to comprising a control system for performing the various operations so arranged that certain operations can only be performed selectively thereby minimizing the possibility of accidentally moving one of the elements, for example, the spindle head, while another element, for example, the table, is moving.

Another object of the present invention is the provision of a novel and improved boring machine of the character referred to comprising means for simultaneously unclamping, moving, and clamping both the spindle head and the back rest block.

Another object of the present invention is the provision of a novel and improved boring machine of the character referred to, the control mechanism of which is so arranged that the drive for moving the spindle head and back rest block is inoperative until the head and back rest block have been unclamped from the ways or columns.

The present invention resides in certain novel details of construction, combinations and arrangements of parts and further objects and advantages of the invention will be apparent to those skilled in the art to which the invention relates from the following description of the preferred embodiment thereof described with reference to the accompanying drawings forming a part of this specification in which similar reference characters designate corresponding parts, and in which:

Fig. 1 is a perspective view of a horizontal boring machine embodying the present invention;

Fig. 2 shows a front elevational view of the horizontal boring machine shown in Fig. 1;

Fig. 3 is a plan view of the machine shown in Fig. 1;

Fig. 4 shows a left-hand end view of the machine shown in Fig. 1;

Fig. 5 is a section on the line 5—5 of Fig. 4, looking in the direction of the arrows;

Fig. 7 is a plan view showing the control mechanism for the feed change transmission shown in Fig. 6, taken approximately on the line 7—7 of Fig. 2;

Fig. 8 is a side view of the control mechanism shown in Fig. 7, taken on the line 8—8 of Figs. 2 and 7, looking in the direction of the arrows;

Fig. 9 is a side elevation of the table and parts of the saddle approximately on the line 9—9 of Fig. 2;

Fig. 10 is an enlarged view of a portion of Fig. 9;

Fig. 11 is a section approximately on the line 11—11 of Fig. 10;

Fig. 12 is an enlarged view of a portion of Fig. 2;

Fig. 13 is a side elevation of the mechanism shown in Fig. 12 approximately on the line 13—13 of Fig. 2;

Fig. 14 is a section approximately on the line 14—14 of Figs. 12 and 13;

Fig. 15 is a section approximately on the line 15—15 of Fig. 12;

Fig. 16 is a diagrammatic view of that portion of the drive for rotating and reciprocating the spindle which is located in the base of the machine;

Fig. 17 is a side view of the control mechanism for the feed change transmission shown in Fig.

Figure 21:
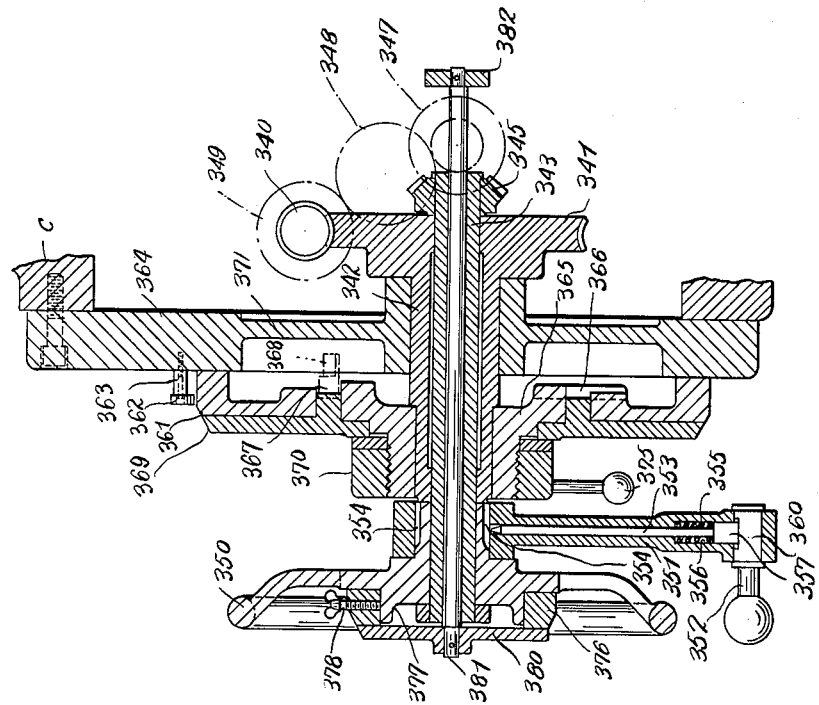
Figure 20:
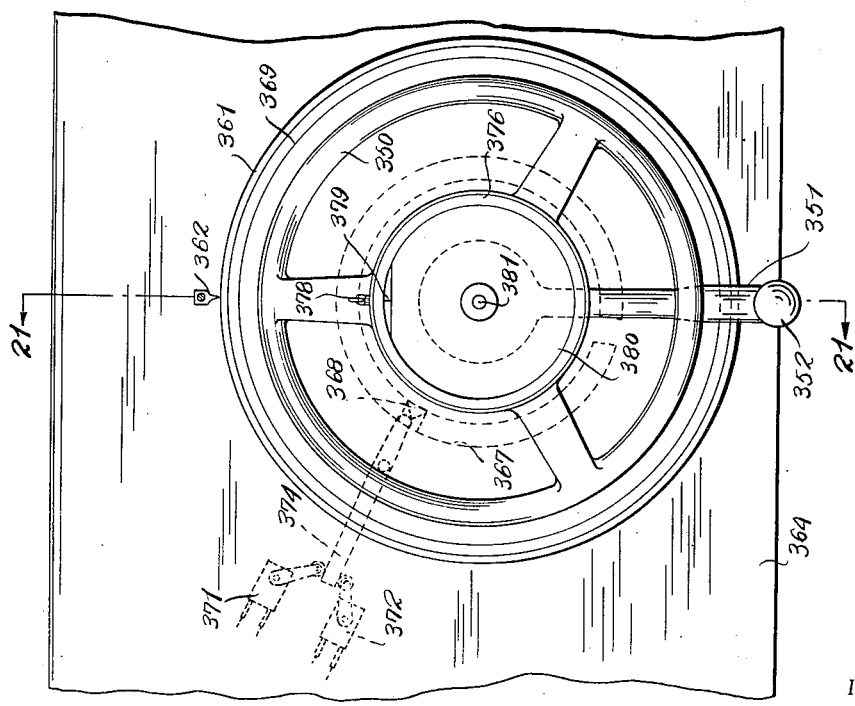
Figure 22:
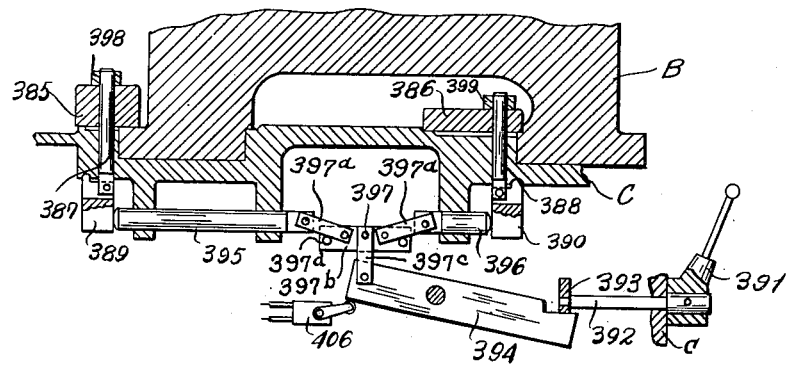
Figure 24:
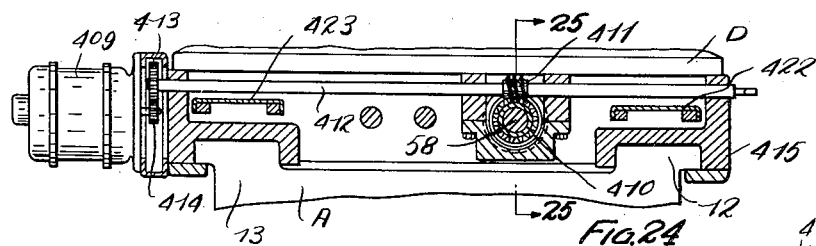
Figure 25:
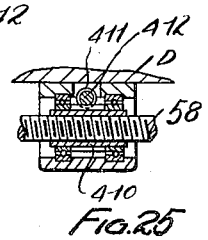
Figure 23:
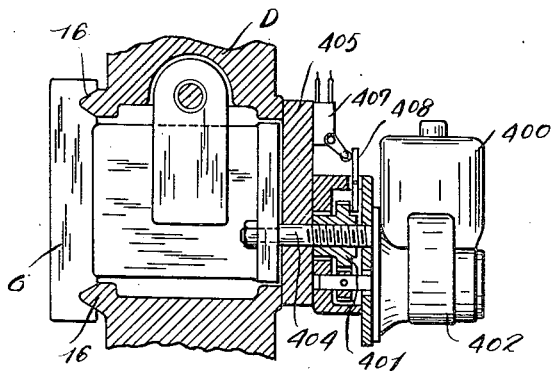
Figures 26, 27, 28:
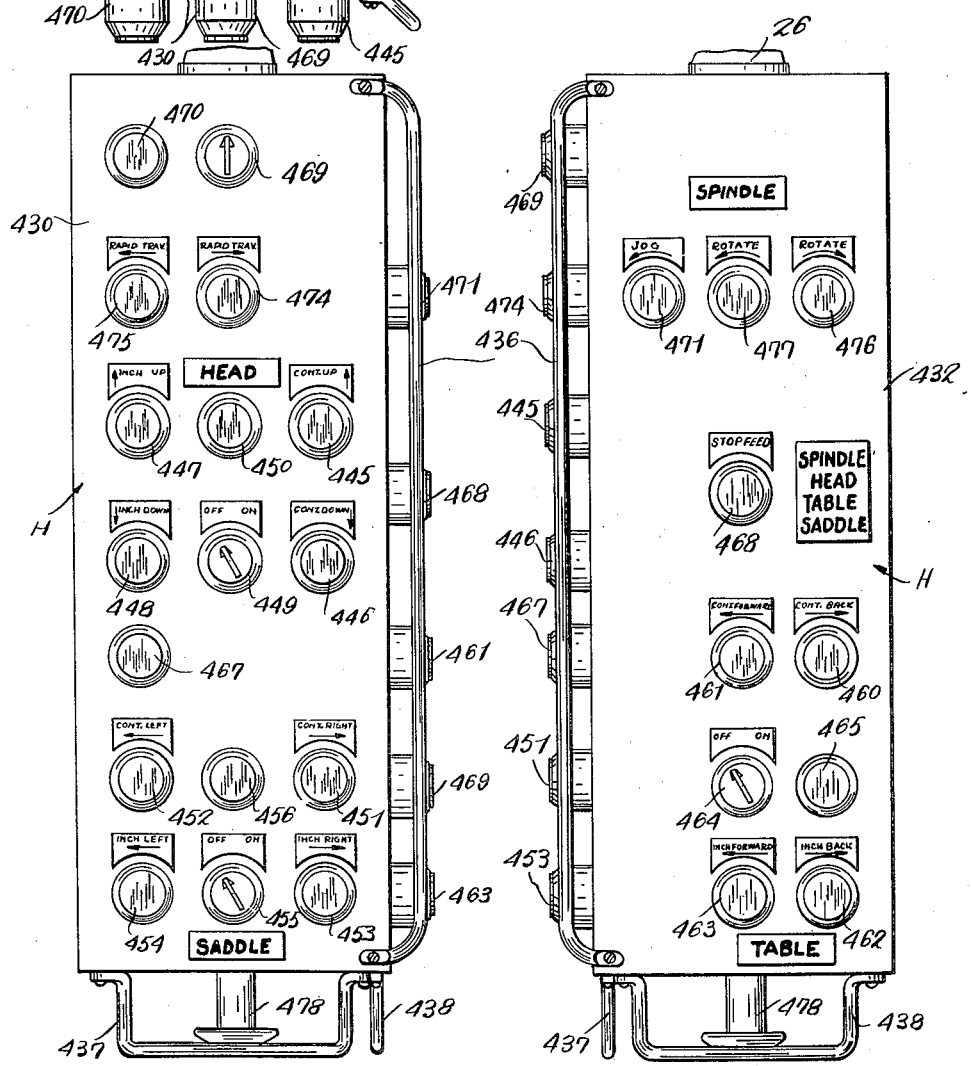
Figure 30:
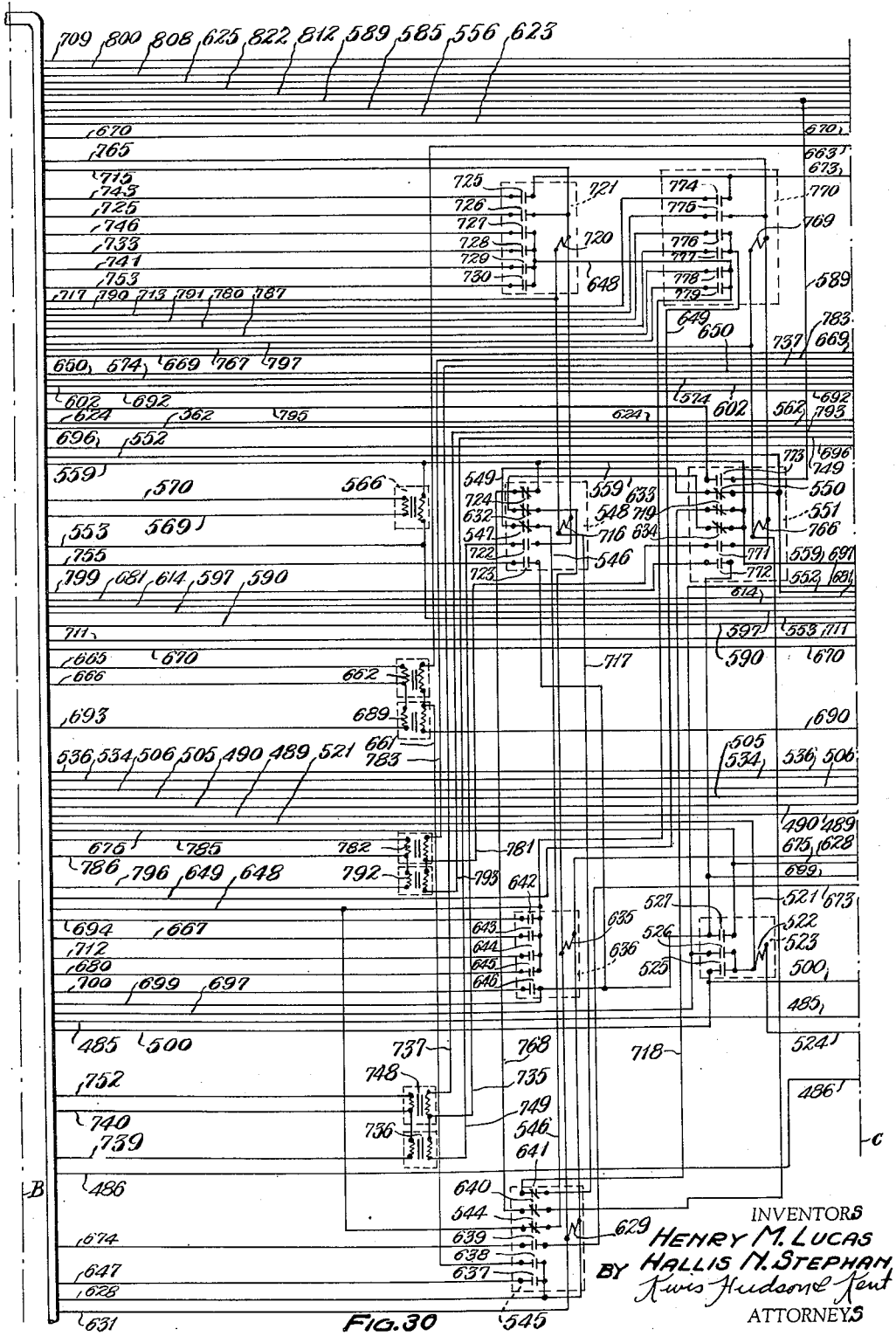
Figure 31:
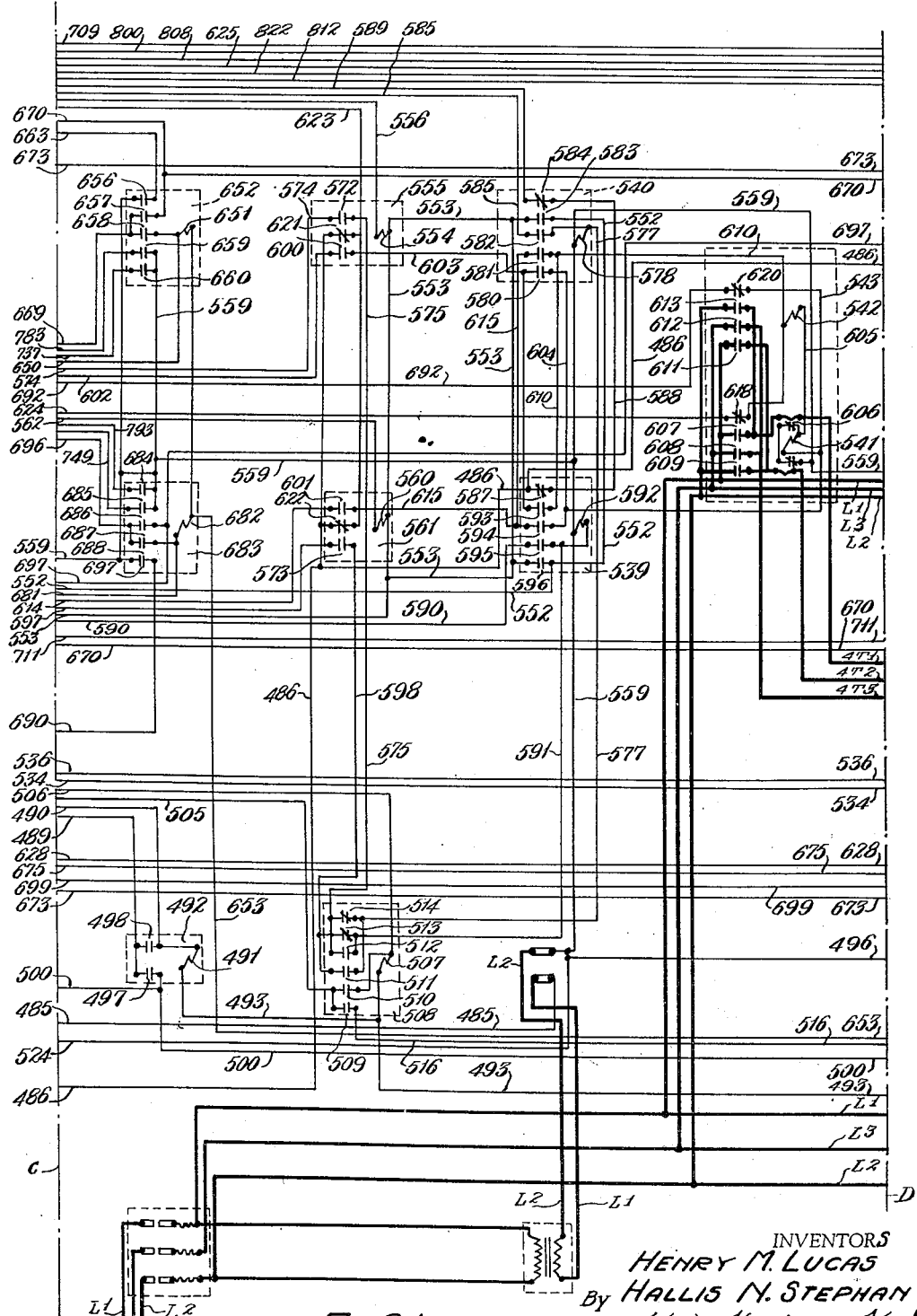
Figure 32:
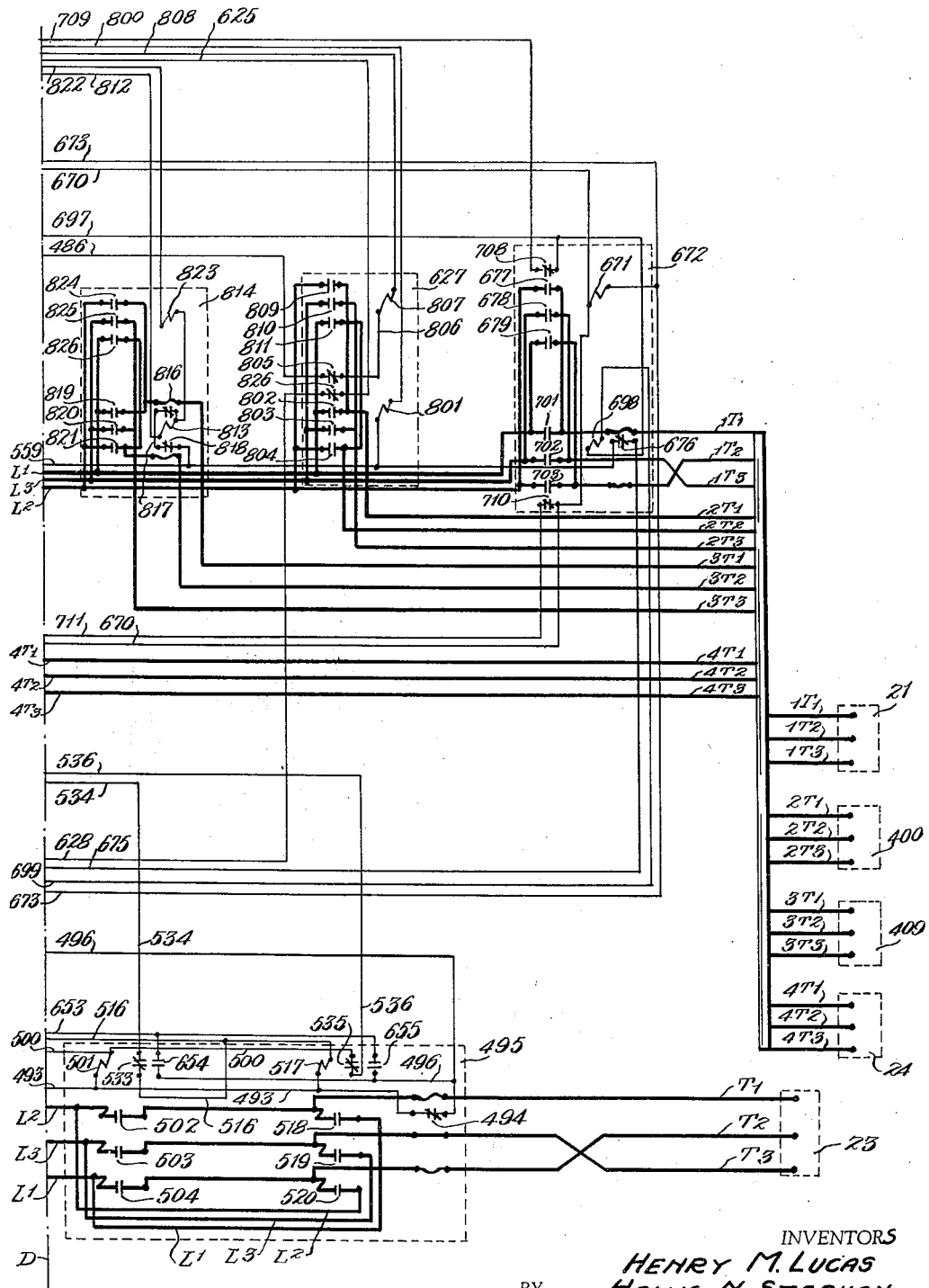

16 approximately on the line 17—17 of Figs. 2 and 16;

Fig. 18 is a plan view of part of the control mechanism shown in Fig. 17 approximately on the line 18—18 of Figs. 2 and 17;

Fig. 19 is a diagrammatic view of the portion of the mechanism for rotating, feeding and traversing the spindle which is located in the spindle head;

Fig. 20 is a front elevation of the spindle feed hand wheel, dials, etc.;

Fig. 21 is a section on the line 21—21 of Figs. 2 and 20;

Fig. 22 is a diagrammatic view of the head clamping mechanism;

Fig. 23 is a section through the backrest clamping mechanism approximately on the line 23—23 of Fig. 2;

Fig. 24 is a section with portions in elevation on the line 24—24 of Fig. 3;

Fig. 25 is a section with portions in elevation on the line 25—25 of Fig. 24;

Fig. 26 is a plan view of the pendant control station taken on the line 26—26 of Fig. 2;

Fig. 27 is a front elevation of the pendant control station as viewed in Fig. 2;

Fig. 28 is a side elevation of the pendant control station shown in Fig. 27, looking from the right;

Figs. 29, 30, 31, and 32 are wiring diagrams of the electrical control system.

Referring to the drawings, the machine shown therein comprises a base A, provided at one end with a spindle head column B formed with vertical ways 10 and 11 upon which a spindle head C is mounted for vertical movement, and at the other end with a backrest or outboard support column D slidably supported on horizontal ways 12 and 13 formed on the upper side of the bed. The ways 12 and 13 also support a saddle E having transverse horizontal ways 14 and 15 on the upper side thereof which in turn support a work table F. The back rest column C is provided with vertical ways 16 and 17 upon which a back rest block G is mounted for vertical movement.

The spindle head which is counterbalanced by a weight (not shown) in the conventional manner, is adapted to be moved vertically along the ways 10 and 11 by a lead screw 18 having threaded engagement with a nut fixed in the spindle head. The lead screw 18 is rotatably supported in the base A and the head column B. In addition to being rotatable in opposite directions the tool spindle, designated generally by the reference character 19, is movable in opposite directions longitudinally of its axis of rotation at different speeds to effect both feeding and traversing movements. The backrest block or outboard support G is movable simultaneously with the movement of the spindle head by a vertical lead screw 20 located within the back rest column D and connected to the drive or mechanism for rotating the screw 18. The saddle E is movable longitudinally of the tool spindle along the ways 12 and 13 and the table F is movable transversely of the tool spindle along the ways 14 and 15, at different speeds by mechanism hereinafter specially referred to.

According to the provisions of the present invention, the speed and direction of rotation of the spindle, etc., and the aforesaid movements of the various elements such as the feed and rapid traverse of the spindle, head, saddle, table, etc., are performed by power and their operation may be controlled from any convenient place about the machine. In the embodiment of the invention shown, five electric motors are employed; a reversible motor 21 hereinafter referred to as the feed and rapid traverse motor, suitably supported on the bed within a guard 22 adjacent to the left-hand end of the machine; a reversible main driving motor 23 arranged for ceiling mounting, also enclosed within the guard 22; a spindle rapid traverse, reversible motor 24 mounted on the head C; a reversible motor 400 for clamping and releasing the back rest block; and a reversible motor 409 for moving the back rest column D.

The feed and rapid traverse motor 21 is connected to the saddle and table feeding and rapid traversing mechanism and to the spindle head and back rest raising and lowering mechanism, the main driving motor 23 is connected to the spindle rotating and feeding mechanism, and the reversible motor 24 actuates the rapid traverse for the tool spindle. The motors are adapted to be selectively connected to the various operating elements through the medium of suitable speed change transmissions, shafts, gears, clutches, etc., the controls for which are located on or adjacent to the base A, spindle head C, and/or pendant electric control station H fixed to the lower end of a pipe 25 connected to a universally movable arm 26 by a flexible cable 27.

The arm 26 (see Fig. 5) is supported adjacent to its rear end on the column B through the medium of a member 28 pivotally connected on the upper end of the column for rotation about a vertical axis by a pin 29 fixed to the column. The arm 26 is connected to the member 28 by being clamped between two portions of a member 30 journaled for rotation about a horizontal axis in the upper end of the member 28. A counterweight 31 carried by an arm 32 fixed to the member 30 counterbalances the weight of the control station H. Preferably some suitable friction or other means is employed for holding the arm 26 in any adjusted position. As shown, a spring-pressed plunger 33 located in an aperture in the member 28 and adapted to cooperate with teeth or serrations in the adjacent side of the hub of the counterweight arm 32 retains the arm 26 in any desired position.

The reversible motor 21 which drives the saddle and table feeding and traversing mechanism and the spindle head and backrest block elevating and lowering mechanism is operatively connected to a horizontally extending shaft 34 rotatably supported in the base A, through the medium of a V-belt drive 35 and spur gears 36 and 37. From the gear 37 the drive is either at a relatively slow or feeding rate through a variable feed change transmission designated generally by the reference character J and an overrunning clutch device designated generally by the reference character K, or at a relatively high or traversing rate through a normally disengaged disk clutch L, a shaft 38, and the overrunning clutch mechanism K. The feed change gears, etc., are housed within a suitable gear box 39 in the base A. Through the medium of the transmission J the shaft 34 may be rotated at various speeds, and through the medium of the normally disengaged friction clutch L, the driven element of which is carried by a gear 40 continuously in mesh with the gear 37, the shaft 34 may be selectively rotated at a high rate of speed. The gear 37 is keyed to the driven shaft of the feed change transmission J and the gear 40 is journaled on the shaft 38. The driving element of the friction clutch L is splined to a shaft 38, which shaft is in axial alignment with the shaft 34 and is adapted to be actuated to engage the clutch L upon energization of an electrically operated solenoid 41 connected to one lever of a bell crank lever 42 pivoted on the frame, the other lever of which is connected to a member 43 which in turn actuates the clutch elements.

The last or driving gear 44 of the transmission J is continuously in mesh with a gear 45 which forms the low speed element of the power transmission mechanism L. The gear 45 is rotatably supported on the shaft 34 and has formed integral therewith the driving element 46 of a normally engaged toothed clutch, the driven element 47 of which is splined on the shaft 34. The left-hand end of the driven element 47, as viewed in Fig. 6, has a plurality of sloping teeth or cam surfaces 48 which cooperate with similar teeth 49 on a high speed driving member 50 fixed to the right-hand end of the high speed shaft 38. The member 47 is continuously urged towards the left, as viewed in Fig. 6, by a compression spring 51 interposed therebetween and the gear 45. The construction is such that the shaft 34 is normally connected to the transmission J through the normally engaged clutch elements 46 and 47 and the gears 44 and 45, with the shaft 38 rotating at the same speed as the shaft 34 due to the engagement of the teeth 48 and 49.

Upon engagement of the friction clutch L, the shaft 38 is rotated at a higher rate of speed than the shaft 34. This difference in speed causes the teeth 48 of the slidable clutch element 47 to climb the teeth 49 of the element 50 carried by the shaft 38, with the result that the slidable clutch element 47 is moved towards the right, disengaging the teeth thereof from the teeth of the clutch element 46, which in turn disengages the low speed drive. Thereafter, the shaft 34 is rotated at the same high speed as the shaft 38. Movement of the member 47 towards the right is limited by the compression spring 51, and the construction is such that the cooperating teeth 48 and 49 are never permitted to clear each other. Both sides of the teeth 48 and 49 are inclined which makes the device operable for either direction of rotation of the motor 21. When the clutch L is released, the spring 51 reengages the cooperating clutch teeth of the clutch elements 46 and 47, and reconnects the feed to the shaft 34 in place of the rapid traverse.

Figure 6:
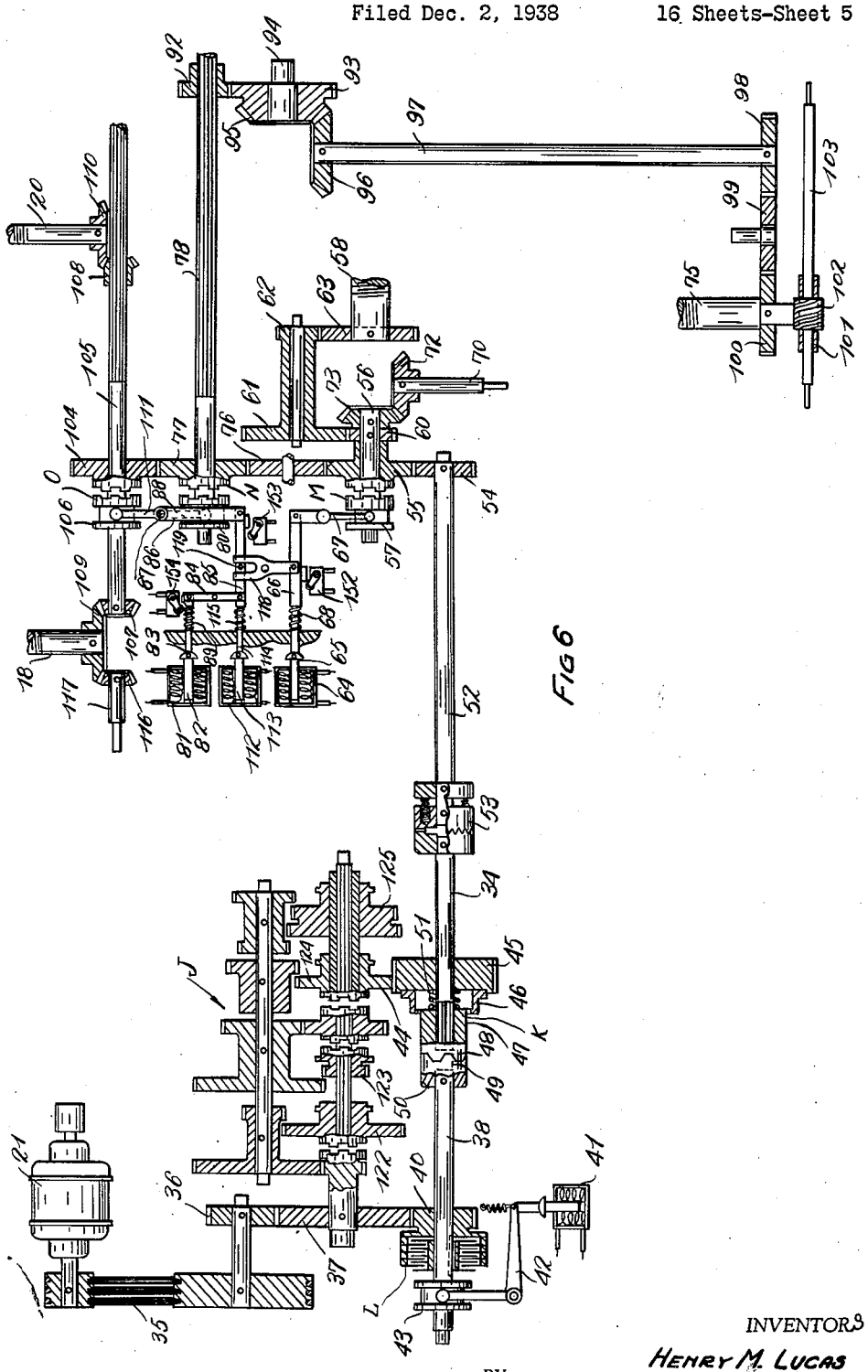
Fig. 6 is a diagrammatic view of the mechanism for reciprocating the saddle and table, and for raising and lowering the spindle head and the backrest block.

The shaft 34 is also in axial alignment with a third shaft 52 to which it is connected by a normally engaged overload release clutch 53, operable in either direction. The right-hand end of the shaft 52, as viewed in Fig. 6, is provided with a gear 54 continuously in mesh with the gear 55 rotatably supported on a shaft 56 to which it is adapted to be selectively connected by a normally disengaged positive drive clutch M, the driven element 57 of which is splined on the left-hand end of the shaft 56 and provided with clutch teeth adapted to engage clutch teeth formed on the hub of the gear 55. The shaft 56 is operatively connected to a lead screw 58 extending longitudinally of the machine and rotatably supported in the base A, which lead screw moves the saddle E along the ways 12 and 13. A gear 60 keyed to the shaft 56 adjacent to the right-hand end thereof is continuously in mesh with a gear 61 of a gear cluster, the smaller gear 62 of which cluster is continuously in mesh with a gear 63 fixed to the lead screw 58.

The movable element 57 of the normally disengaged clutch M is adapted to be moved toward the right, as viewed in Fig. 6, to engage the clutch and thereby connect the lead screw 58 to the shaft 52 and in turn the feed and rapid traverse motor 21 by an electric solenoid 64 suitably supported in the base A of the machine, the armature 65 of which solenoid is connected to the slidable clutch element 57 by a slidable rod 66 and a pivoted yoke member 67. The clutch is normally held in disengaged position by a compression spring 68 surrounding the rod 66 and interposed between the frame of the machine and a shoulder on the rod 66. A hand feed is provided for the saddle E in the form of a rotatable shaft 70, the front end of which, as viewed in Fig. 6, projects through the front of a member 71 fixed to the base A and is arranged for the reception of a hand crank. The inner end of the shaft 70 is connected to the shaft 56 by miter gears 72 and 73.

The table F is adapted to be moved along the ways 14 and 15 of the saddle E by a lead screw 75 rotatably supported in the saddle and operatively connected to a suitable nut fixed to the underside of the table. The lead screw 75 is adapted to be selectively connected to the shaft 52 in a manner similar to that in which the lead screw 58 is selectively connected to said shaft 52, which manner of connection has just been described. The gear 55 journaled on the shaft 56 is continuously in mesh with a gear 76 which in turn is continuously in mesh with a gear 77 journaled on a shaft 78 rotatably supported in the base A and extending substantially the length thereof.

The gear 77 is adapted to be selectively connected to the shaft 78 by a normally disengaged, positive drive tooth clutch N similar to the clutch M. The slidable element 80 of the clutch N is splined to the left-hand end of the shaft 78 and is moved towards the right to engage the teeth thereof with teeth formed on the hub of gear 77 by an electric solenoid 81, the armature 82 of which is adapted to be connected to the movable clutch element 80 through the medium of a slidable rod 83 connected to the armature 82 and to one end of a pivoted lever 84, the opposite end of which lever is connected to a slidable rod 85 which in turn is connected to a pivoted lever 86 carried by a short shaft 87 journaled in the frame, to the lower end of which shaft is secured a clutch operating yoke 88 that engages in a groove formed in the movable clutch member 80. The pivoted lever 86 is continuously urged in a clockwise direction, as viewed in Fig. 6, by a compression spring 89 interposed between the frame of the machine and the upper end of the lever 84. The construction is such that upon energization of the solenoid 81, the armature 82 is moved towards the left, rotating the member 86 in a counterclockwise direction and engaging the clutch N.

A gear 92 carried by the saddle E and splined to the shaft 78 is continuously in mesh with a gear 93 journaled on a shaft 94 and formed integral with a bevel gear 95. The bevel gear 95 meshes with a bevel gear 96 fixed to the rear end of the transverse shaft 97 rotatably supported in the saddle E, the forward end of which is connected to the lead screw 75 by change gears 98, 99, and 100, the first of which is keyed to the forward end of the shaft 97 and is continuously in mesh with the idler gear 99, which in turn meshes with the gear 100 keyed to the lead screw 75. The forward end of the lead screw is provided with a worm wheel 101 continuously in mesh with the worm 102 fixed to a shaft 103 journaled in the saddle and extending longitudinally of the machine. The ends of the shaft 103 project from opposite sides of the saddle and are arranged for the reception of a hand crank.

The lead screw 18 which is adapted to raise and lower the spindle head and the lead screw 20 which is adapted to raise and lower the back rest block are adapted to be selectively connected to the shaft 52 in a manner similar to that in which the lead screws 58 and 75 are connected to the shaft 52. For this purpose, the gear 77 journaled on the left-hand end of the shaft 78 is continuously in mesh with a gear 104 journaled on a longitudinally extending shaft 105 to which it is adapted to be operatively connected by a normally disengaged tooth clutch O, similar in construction to the clutches M and N previously referred to, the movable element 106 of which is splined to the shaft 105. The shaft 105 carries two bevel gears 107 and 108 continuously in mesh with bevel gears 109 and 110 fixed to the lower end of the lead screws 18 and 20, respectively. The gear 108 is splined to the shaft 105 and moves therealong with movement of the outboard column D.

The movable element 106 of the clutch O is adapted to be shifted longitudinally of the shaft 105 to engage and disengage the clutch by a clutch yoke member 111 formed integral with the clutch yoke member 88. The clutch yoke 111 is adapted to be rotated in a clockwise direction to engage the clutch O by an electric solenoid 112, the armature 113 of which is connected to the lower end of the pivoted lever 84 by a slidable rod 114. A compression spring 115 surrounding the rod 114 and interposed between the frame of the machine and the lever 84 normally maintains the clutch O disengaged. The gear 109 fixed to the lower end of the lead screw 18 is also engaged by a bevel gear 116 fixed to the rear end of a shaft 117 journaled in the member 71. The shaft 117 projects to the front of the machine where it is arranged for the reception of the hand crank. This construction provides means for manually raising or lowering the spindle head and the backrest block. The slidable members 66 and 85 are mechanically interlocked by a Y-shaped member 118 pivotally supported intermediate its ends by the frame of the machine, in such a manner that by moving one the other can be pulled into its neutral position. The lower end of the member 118 is pivotally connected to the member 66 and a pin 119 carried by the member 85 projects between the upper ends thereof.

The particular arrangement of the gears, clutches, etc., in the feed change transmission J is such that the R. P. M. of the driven member is always less than the R. P. M. of their respective driving members. The transmission shown comprises four shiftable elements 122, 123, 124, and 125, the first two of which, 122 and 123, are controlled by a face cam 126 (see Figs. 7 and 8) to which they are connected by suitable levers, etc., designated generally as 127 and 128. The second two shiftable members 124 and 125 are controlled by a face cam 129 to which they are connected by suitable levers, etc., designated generally as 130 and 131. The face cam 126 is fixed to a transversely extending horizontal shaft 132, the forward end of which projects through the gear box 39 where it is provided with a hand lever 133 for manual operation. The rear end of the shaft 132 is connected to a vertical shaft 134 by a pair of miter gears 135 and 136. The shaft 134 extends up through the frame of the spindle head and is adapted to be rotated in either direction by a hand lever 137 fixed to a shaft 138 rotatably supported in the spindle head. The shaft 134 is connected to the shaft 138 by a pair of miter gears 139 and 140, the former of which is splined to the vertical shaft 134 so as not to interfere with the vertical movement of the spindle head. The cam 129 is fixed to a transverse horizontal shaft 146, the forward end of which carries a manually operable lever 147 similar to the lever 133 carried by the shaft 132. The rear end of the shaft 146 is operatively connected to a manually controlled lever 150 similar to the lever 137 by a vertical shaft 151 in a manner similar to that in which the lever 137 is connected to the shaft 132 by the vertical shaft 134. The construction is such that the levers 133 and 147, and 137 and 150 can be rotated through 360°. This greatly facilitates setting up the machine.

From the foregoing description, it will be apparent that the saddle, table, spindle head, and backrest block may be operated selectively either manually or by the reversible feed and rapid traverse motor 21. If operated by the motor 21, the movements may be in either direction and at either a feed rate or a rapid traverse rate. The arrangement of the clutches for moving the table and the spindle head and backrest block is such that it is impossible to simultaneously engage both clutches. The manner in which the solenoids 41, 64, 81, and 112 are energized will be hereinafter more specifically referred to. The construction also includes three normally open electric switches 152, 153, and 154, the former of which is operatively connected to the rod 66 in such a manner that the circuit therethrough is closed for any position of the rod 66 other than the neutral position shown in Fig. 6. The switch 153 is operatively connected to the rod 85 in a manner similar to that in which the switch 152 is connected to the rod 66 and the circuit through the switch 153 is closed for any position of the rod 85 other than neutral position shown in Fig. 6. The switch 154 is operatively connected to the rod 83 in such a manner that the circuit therethrough is closed for any position of the rod 83 other than the neutral position thereof shown in Fig. 6. The function of these switches will be hereinafter referred to.

In addition to the switches 152, 153, and 154, a number of suitable normally closed limit switches are employed, which switches stop the feed and rapid traverse motor 21 when the particular element, that is, head, saddle, or table, being moved thereby, reaches the end of its travel. These limit switches are interlocked in a manner hereinafter described so that the limit switches of the elements not being moved will not interfere with the actuation of the element which it is desired to feed or rapid traverse.

Reciprocation of the table F is adapted to be automatically controlled by three limit switches 155, 156, and 157. The limit switches 155 and 156 are normally closed switches and control the feed movement, and the limit switch 157 controls the rapid traverse movement. The limit switches 155 and 156 are adapted to be opened by downwardly extending projections 158 on a plurality of stops 159, 160, 161 and 162, respectively, the first two of which stops are fixed to a member 163 carried by the table proper while the second two are adjustable therealong. The downwardly extending projections on the stops are adapted to engage the upper end of a lever 164 pivotally supported in the saddle E, the lower end of which lever 164 is adapted to engage the operating arms of the limit switches 155 or 156, depending upon the direction in which the lever is rotated. The adjustable stops 161 and 162 provide means for automatically stopping the feed movement of the table at any place intermediate its extreme limits and the fixed stops 159 and 160 limit the extreme movement of the table.

The switch 157 is so located in the control circuit that the solenoid 41 is energized and the rapid traverse drive made operative upon the closing of normally open contacts thereof. The switch 157 is adapted to be closed by the lower end of a lever 166 pivoted in the saddle E, which lever has three positions; the full line and the dotted line positions shown in Fig. 10 and the full line position shown in Fig. 9. The lever is adapted to be shifted from the full line position shown in Fig. 10 to the dotted line position shown therein to permit the switch 157 to open, thus discontinuing the rapid traverse drive by inclined cam surfaces 168 on the stops 159, 160, 161, and 162, previously mentioned, and stops 169. The lever 166 is adapted to be rotated from the full line position shown in Fig. 10 to the dotted line position shown therein by the cam surfaces 168 as they pass over the upper end of the lever irrespective of the direction in which the table is moved. An inclined cam surface 172 on a stop 173 moves the lever 166 in the opposite direction. The stops 169 and 173 are adjustable along the table F. The construction is such that any predetermined arrangement of feed movements and rapid traverse movements desired can be obtained by a proper selection and adjustment of the stops, but in no event can the table be moved past the fixed stops 159 and 160. When the lever 166 is rotated to the position shown in Fig. 9, it is entirely clear of all of the stops and the table can be moved without danger of the rapid traverse being automatically thrown in. The same result could be accomplished, less conveniently, however, by removing the stop or stops 173.

Manual means is provided for rotating the lever 166 from one position to another in the form of a lever 175 operatively connected thereto through mechanism (not shown) which lever has three positions corresponding with the three positions of the lever 166. The saddle E has a groove formed on the upper side of an extension 177 thereon (see Fig. 11) adapted to receive a measuring rod or rods 178, the left-hand end of which, as viewed in Figs. 9 and 10, cooperates with an anvil on an adjustable block 179 carried by the table F and adjustable along the ways 180 on the member 163. The construction is such that the adjustable block 179 does not interfere with the stops previously referred to. The right-hand end of the measuring rod cooperates with a dial gauge 182 fixed to the front end of the saddle. A scale pointer 183 carried by the table F cooperates with the scale 184 on the saddle E. The index rods and the scale and scale pointer facilitate the setting up of work on the machine.

The upper and lower limits of movement of the spindle head C are controlled by two normally closed limit switches 185 and 186 fixed to the spindle head C and adapted to cooperate with upper and lower adjustable stops 187 and 188, respectively, carried on the three rear splines of a vertical six-spline shaft 189. The stops 187 and 188 have projections thereon which make it impossible to move the spindle head C past these stops. The particular location of the limit switches 185 and 186 in the electrical circuit will be hereinafter referred to. The middle spline of the front three splines of the shaft 189 is removed and the shaft is provided with a scale 190 in place thereof. A plurality of members 192 adapted to be clipped on the front splines of the shaft 189 and adjustable therealong provide means for supporting an index rod 193, the lower end of which is supported on an anvil carried by a projection 194 on the spindle head C. The upper end of the index rod 193 is adapted to engage a micrometer device 195 adjustably supported on the front splines of the shaft 189. As shown the members 192 are made in two parts continuously urged together by a spring 196 positioned underneath the head of a screw 197 threaded into one of the parts and extending through the other. The construction just described facilitates the setting up of work on the machine. The limit switches 198 and 199 which limit the movement of the saddle, are not shown on the machine but their connection in the circuit is shown on the wiring diagrams hereinafter referred to. The limit switches 198 and 199 are located underneath the rear of the saddle on the left and right-hand sides, respectively, and are adapted to be opened upon engagement with stops 200 and 201, respectively, located on the bed of the machine and limit the travel of the saddle towards the left and right, respectively.

The spindle 19 is adapted to be rotated at various rates of speed by the main driving reversible motor 23 through the medium of speed change gearing designated generally by the reference character P housed in a suitable gear box 209 supported in the bed of the machine; a vertical shaft 210, the lower end of which is rotatably supported in the gear box 209 while the upper end is supported in the head column B; and back gears designated generally by the reference character R located in the spindle head C. The motor 23 is connected to the driven shaft 211 of the speed change transmission P by a V-belt drive 212 and spur gears 213 and 214, the former of which is fixed to a shaft 215 carrying the driven pulley 216 of the V-belt drive while the latter is fixed to the shaft 211. The driving shaft 217 of the transmission P is connected to the lower end of the vertical shaft 210 by miter gears 218 and 219. The speed change transmission P provides nine different speeds and comprises gear clusters 220 and 221 slidably supported on the shafts 211 and 217, respectively, and adapted to cooperate with gear clusters 222 and 223 fixed to an intermediate shaft 224.

The gear clusters 220 and 221 are adapted to be shifted lengthwise of the shafts 211 and 217 upon which they are slidably splined to obtain the various speeds by yoke members 225 and 226 carried by slidable rods 230 and 231, respectively. The rod 230 is slidably supported in the gear box 209 in a suitable manner and has a rack 232 formed thereon which is continuously in mesh with a gear sector 233 fixed adjacent to the lower end of a vertical shaft 234 projecting upwardly from the gear box and extending through the spindle head. Immediately above the base A the shaft 234 is provided with a hand lever 235 through the medium of which the gear cluster 220 may be manually moved.

The shaft 234 can also be manually rotated from a hand lever 236 fixed to a short shaft 237 journaled in the spindle head C, and operatively connected to the shaft 234 through the medium of a gear 239 rotatably supported in a member 240 fixed to the face of the spindle head. The gear 239 is splined on the shaft 234 and in mesh with a rack 241 formed on the front face of a slidable bar 242 suitably supported in the member 240. The upper side of the bar 242 is provided with a similar rack 243 continuously in mesh with a geart 244 fixed to the rear end of the shaft 237, the front end of which shaft carries the hand lever 236, previously referred to. The slidable rod 242 which carries the yoke 226 has rack teeth 245 formed thereon which mesh with a gear sector 246 fixed to the lower end of a vertical shaft 247 similar to the shaft 234 previously referred to. The shaft 247 is adapted to be manually rotated in either direction to shift the gear cluster 221 by hand levers 248 and 249 located just above the gear box 39 and on the spindle head, respectively, and operatively connected to the shaft 247 in a manner similar to that in which the levers 235 and 236, with which they correspond, are operatively connected with the shaft 234. The construction is such that either the gear cluster 220 or the gear cluster 221 can be manually shifted by the levers 235 and 248 adjacent to the gear box or by the levers 236 and 249 on the spindle head C.

The driven shaft 255 of the back gears R is rotatably supported in the spindle head and is connected to the upper end of the vertical shaft 210 by a bevel gear 256 carried by the spindle head and splined to the shaft 210. The bevel gear 256 meshes with a bevel gear 257 fixed to the left-hand end of the shaft 255. The spindle 19 is slidably keyed within a spindle quill 258 rotatably supported by suitable bearings in the spindle head C, which spindle quill has a gear cluster comprising the gears 259 and 260 fixed thereto. The gears 259 and 260 are adapted to be selectively engaged by gears 262 and 263, respectively, of a gear cluster splined to the shaft 255. When the gear 259 is in mesh with the gear 262 and the motor 23 operated, the spindle is rotated at a comparatively slow speed. A higher speed is obtained by meshing the gear 260 with the gear 263 and a still higher speed is obtainable through the medium of a V-belt final drive 265 when the gear 263 is shifted into engagement with a gear 266 fixed to a short shaft 267 journaled in the spindle head which shaft carries the driving pulley 268 of the V-belt drive 265. The gear cluster comprising the gears 262 and 263 is adapted to be shifted along the shaft 255 by a hand lever 269 fixed to the front end of a horizontal shaft 270 journaled in the spindle head, the rear end of which shaft carries a yoke member engageable with the gear cluster.

From the foregoing description it will be apparent that the speed of rotation of the spindle may be varied not only by the change speed transmission P but also by shifting the back gears R.

The spindle 19 is adapted to be fed or rapid traversed in either direction by a lead screw 271 rotatably supported in the spindle head extension 272 and having threaded engagement with a two-piece nut 273 which eliminates all backlash located within the feed slide 274 located adjacent to the left-hand end of the spindle and connected thereto by the bearings 275. The lead screw 271 is adapted to be rotated in either direction and at different speeds from the spindle quill 258 through the medium of spur gears 276 and 277, the former of which is fixed to the left-hand end of the spindle quill while the latter is fixed to the right-hand end of a shaft 279 journaled in the spindle head and which forms the driving shaft of a feed speed change transmission designated generally by the reference character S housed within a suitable gear box in the spindle head. The gear 280 which forms the driving element of the feed change transmission S is operatively connected to a horizontal shaft 281 journaled in the spindle head through the medium of a gear 282 which forms the low speed element of an overrunning clutch transmission T similar to the transmission K previously described.

The shaft 281 is adapted to be selectively rotated at a high rate of speed in either direction by the reversible rapid traverse motor 24, which motor is operatively connected to the high speed element 285 of the overrunning clutch transmission T, which element is formed integral with a bevel gear 286 journalled on the shaft 281. The gear 286 meshes with a bevel gear 287 fixed to the forward end of a transversely extending horizontal shaft 288, the rear end of which is provided with a gear 289 in mesh with a gear 290 on the armature shaft 241 of the motor 24. The reference character 292 designates the movable element of the overrunning clutch mechanism T which corresponds with the member 47 of the mechanism K. The member 292 is splined to the shaft 281 and has clutch teeth on the right-hand end which engage corresponding teeth on a member 293 carried by the gear 282. The spring which continuously urges the member 292 to the left, as viewed in Fig. 19, is designated as 294. The left-hand end of the member 292 has cam teeth 295 with sloping sides formed thereon which cooperate with similar teeth 296 on the hub of the gear 286 similar to that in which the teeth 48 cooperate with the teeth 49.

The shaft 281 is adapted to be operatively connected to a horizontal shaft 300 journaled in the spindle head and extending substantially the length thereof through the medium of a gear cluster comprising spaced gears 301 and 302. The gear 301 is in mesh with a gear 303 journaled on the shaft 300, and the gear 302 meshes with a gear 304 which in turn meshes with a gear 305 also journaled on the shaft 300. The gear 304 is journaled on a jack shaft 306 and the gear 305 rotates in a direction opposite to the direction of rotation of the gear 303. The gears 303 and 305 are adapted to be selectively connected to the shaft 300 by a shiftable clutch element 307 splined on the shaft 300 between the gears 303 and 305, opposite ends of which clutch element are provided with clutch teeth adapted to cooperate with similar clutch teeth formed on the adjacent sides of the hubs of the gears 303 and 305. The clutch element 307 is normally maintained in an intermediate or neutral position by a pair of springs 308 and 309 but is adapted to be shifted towards the left to drive the shaft 300 from the gear 303 or towards the right to connect the gear 305 with the shaft 300 by electric solenoids 311 and 312, respectively.

The armature 313 of the solenoid 311 is connected to a slidable member 314 provided with an inclined cam slot 315 within which a roller 316 carried by a longitudinally slidable rod 317 engages. The armature 320 of the solenoid 312 is connected to the bar 317 in a manner similar to that in which the armature 313 is connected thereto, except for the fact that the cam slot 321 in the member 322 corresponding to the member 314 is inclined in the opposite direction to the slot 315. The lower ends of the cam slots 315 and 321 are widened so that the operation of one of the members 314 and 322 will not be interfered with by the other. The slidable member 317 has a clutch yoke 325 fixed to the right-hand end thereof which engages in a groove 326 formed in the shiftable clutch member 307. The bar 317 is normally held in such a position that the clutch element 307 is in neutral position by the springs 308 and 309 which are located in a cut-out portion of the bar and engage opposite sides of a stationary stop 327 fixed to the frame of the machine. Movement of the member 317 out of its neutral position also closes one or the other of two normally open switches 328 and 329. When the member 317 moves towards the left, a projection 330 actuates the switch 328 to close the circuit therethrough and movement thereof from the neutral position towards the right causes a second projection 331 to actuate the switch 329 to close the circuit therethrough. The function of these switches will be hereinafter referred to.

The left-hand end of the shaft 300 is connected to a gear 335 journaled thereon through the medium of an automatic release overload clutch 336. The gear 335 constitutes the driving gear of gears designated generally by the reference character U, the driven gear 337 of which is fixed to the end of the lead screw 271.

The spindle feed slide 274 has within it a backlash mechanism including the two-part nut 273, similar to that disclosed in United States Patent No. 1,119,705, and which per se forms no part of the present invention and will not be described in detail.

Adjacent to its right-hand end, the shaft 300 is provided with a worm gear 340 continuously in mesh with a worm wheel 341 (see Fig. 21) fixed to the rear end of a horizontal tubular shaft 342 journaled coaxially in the spindle head with a shaft 343 which projects therethrough. The rear end of the shaft 343 is connected to a jack shaft 344 by miter gears 345 and 346. The right-hand end of the shaft 344, as viewed in Fig. 19, is connected to shaft 300 through the medium of gears 347, 348, and 349. The right-hand end of the shaft 343, as viewed in Fig. 21, is provided with a hand wheel 350 hereinafter referred to as the spindle feed hand wheel, through the medium of which the shaft 343 may be manually rotated and in turn the spindle moved or adjusted. A crank 351 journaled on the hub of the hand wheel 350 provides means for manually rotating the shaft 343 at a more rapid rate than can be accomplished by turning the hand wheel 350. The crank 351 is normally diconnected from the hand wheel 350 but is adapted to be automatically connected thereto by grasping the hand grasp 352 through the medium of a plunger 353, the upper end of which, as viewed in Fig. 21, is adapted to engage in the slots 354 milled in the hub of the hand wheel but which is normally held out of engagement therewith by a spring 355 located in a counterbore 356 in the crank lever 351, and interposed between the bottom of the counter bore and an enlarged end 357 formed on the member 353. When the hand grasp 352 is gripped by the operator and moved in either direction about the axis of rotation of the shaft 343, a cam surface on the rear end 360 of the hand grasp 352 raises the plunger 353. When the hand grasp 352 is released, the plunger 353 is returned to its original position by the spring 355.

The tubular shaft 342 is journaled in the spindle head through the medium of a plate 364 forming a part of the spindle head frame and the left-hand end thereof, as viewed in Fig. 21, has a large dial 361 fixed thereto. This dial, through the medium of the shaft 342, etc., is continuously connected to the spindle feed screw 271. The construction is such that one revolution of the dial gives full travel of the spindle feed and the graduations on the dial which cooperate with a dead line 362 on a member 363 fixed to the spindle head C are so arranged that the dial always gives a direct indication of the amount that the spindle projects out to the right from the face of the spindle sleeve or spindle head. The dial 361 is connected to a hub member 365 through the medium of a narrow strap 366 in such a manner as to provide an arcuate opening 367 between the dial 361 and the member 365, through which opening a trip 368 projects.

The trip 368 is carried by a second dial 369 rotatably supported about the member 365 and coaxial with the dial 361. The dial 369 is adapted to be adjusted relative to the dial 361 and secured in any adjusted position by a nut 370 threaded on the left-hand end of the member 365. The trip 368 is adapted to stop the feed in either direction by opening normally closed limit switches 371 and 372, the contacts of which are in series circuit with relays which control the feed solenoids 311 and 312, respectively. The switches 371 and 372 are secured to the rear face of the member 364 and are operated by the trip 368 through the medium of a pivoted member 374. The construction is such that the feed can be automatically stopped at any desired point by setting the adjustable dial 369. The graduations of the main dial 361 read in a counterclockwise direction and the graduations of the adjustable dial 369 in a clockwise direction. The dial clamping nut 370 is provided with a hand grasp 375 which facilitates operation of the nut and in turn adjustment of the dial 369. The hand wheel 350 which makes one revolution for each quarter of an inch travel of the spindle is provided with an angular face angularly adjustable dial 376 rotatably supported on a boss 377 formed integral with the hub of the hand wheel and adapted to be secured in any adjusted position by means of a set screw 378. The dial 376 cooperates with a dead line mark 379 on a non-rotatable or stationary disk 380 fixed to the forward end of the transversely extending rod 381, the rear end of which is secured to the frame of the spindle head through the medium of a strap 382. The dial 376 is graduated to read in thousandths of an inch.

The mechanism for clamping the spindle head C to the column B is shown diagrammatically in Fig. 22. Portions of the ways 10 on the column B are adapted to be clamped between clamp members 385 and 386 and the spindle head. The clamp members are adapted to be actuated by rods 387 and 388, respectively, projecting therethrough and pivotally connected at their front ends, as viewed in Fig. 22, to pivoted blocks or members 389 and 390, respectively. The members 389 and 390 are adapted to be rocked or rotated about their pivots to clamp and unclamp the spindle head upon rotation of the hand grasp 391 fixed to the forward end of a short shaft 392 rotatably supported in the spindle head frame. The rear end of the shaft 392 is provided with a cam disk 393 which cooperates with a pivoted lever 394, the rear end of which lever is connected to the pins 395 and 396 through a toggle equalizing mechanism designated generally by the reference character 397 and comprising a plurality of links 397a connected to the pins 395 and 396 and to a member 397b, the midpoint of which is pivotally connected to one end of a link 397c, the other end of which is pivotally connected to the rear end of the lever 394. Rotation of the links 397a relative to the member 397b in one direction is limited by the pins 397d. The pins 395 and 396 are slidably supported in the spindle head C and cooperate with the members 389 and 390, respectively, to rock the latter about their pivots. Nuts 398 and 399 threaded onto the rear ends of the rods 387 and 388, respectively, provide adjustment for the clamp means. Similar mechanism is employed to clamp the table F to the ways 14 and 15, and to saddle E and backrest column D to the ways 12 and 13.

The backrest block G is adapted to be clamped to and unclamped from the ways 16 of the column D by an electric motor 400 carried thereby and operatively connected to a nut in the form of a gear 401 through the medium of a worm gear reduction 402. The gear or nut 401 has threaded engagement with a bolt 404 adjustably secured to the backrest block. The bolt 404 projects through a clamp plate 405 which engages the right-hand side of the column D. The circuit to the motor 400 is controlled by a normally open switch 406 operatively connected to the lever 394 in such a manner that when the lever 394 is in a position to clamp the spindle head C to the column B, the circuit therethrough is closed. The construction is such that the motor is operated to clamp and unclamp the backrest block simultaneously with the clamping and unclamping of the spindle head C. The circuit to the motor 400 includes a normally open switch 407 fixed to the clamp plate 405 and operated by a pivoted lever 408, one end of which engages the gear 401. The circuit through the switch 407 is maintained closed by the lever 408 while the backrest block is clamped to the column D. The control for the motor 400 is also interlocked with the main control in such a manner that the solenoid 112 cannot be actuated to connect the lead screws 18 and 20 which raise and lower the spindle head and backrest block, respectively, with the feed motor while the spindle head and backrest block are clamped to the columns B and D, respectively. In other words, the construction is such that the mechanism for raising and lowering the spindle head and backrest block cannot be operated while these elements are clamped to their respective columns.

The backrest column D may be moved along the horizontal ways 12 and 13 of the bed A either manually or by the motor 409. The motor 409 is fixed to a bracket secured to the rear side of the backrest column base and is operatively connected to a nut 410 rotatably supported in the backrest column D against longitudinal movement and having threaded engagement with the lead screw 58. The nut 410 has a worm wheel formed on the periphery thereof which is continuously in mesh with a worm 411 fixed to a transverse shaft 412, the rear end of which shaft is connected to the rotor shaft of the motor 409 by spur gears 413 and 414, the latter of which is fixed to the shaft 412 while the former is fixed to the rotor shaft of the motor 409. The front end of the shaft 412 projects through the front wall of the backrest base 415 of the backrest column D where it is provided with means adapted to receive a hand crank. The construction of the front end of the shaft is similar to that of the shafts 70, 103, or 117 previously referred to. The operation of the motor 409 is adapted to be controlled by two normally open push button switches 416 and 417 located on the front side of the backrest column D underneath a manual lever 418. The manual lever 418 actuates clamp means adapted to clamp the backrest column to the ways 12 and 13 in any adjusted position. The construction is such that the push button switches 416 and 417 cannot be operated unless the lever 418 is in a position to unclamp the backrest column from the ways. The worm gear formed on the periphery of the nut 410 and the worm 411 are not of the self-locking type, which permits the nut 410 to rotate when the lead screw 58 is rotated to move the saddle E. Thus the saddle E can be moved by the lead screw 58 without effecting any movement of the backrest column D. However, the backrest column D can be moved by the lead screw 58 concurrently with the movement of the saddle E by holding the shaft 412 against rotation. This can be accomplished manually by means of the hand crank, or if desired, suitable other means can be employed.

The machine shown is of the table type and both the bed A and the saddle E are provided with steps or platforms 419, 420, and 421, respectively, on opposite sides which enable the operator to readily step up on the machine and walk thereabout. The ways 12 and 13 are protected by way guards 422 and 423 located thereabove. The way guards project through suitable apertures in the backrest column D and the saddle E and are supported at opposite ends upon the base A through the medium of brackets 424. The machine is also provided with platform means 425 and 426 on opposite sides of the saddle E spanning the space between the way guards. These features of the present machine are not claimed in this application but are claimed in our copending application Serial No. 254,436 entitled Horizontal boring machine, filed February 3, 1939, now Patent No. 2,208,311 issued July 16, 1940.

In operation, after the desired feeds have been selected, the remaining operations of the machine are controlled from the electrical control station H previously referred to. The various selecting switches, push button switches, etc., of the control station H are so arranged that their position corresponds to the direction of movement initiated or controlled thereby. For example, the push button switches and selecting switches, etc., which are concerned with movements of the various elements longitudinally of the machine are arranged on the front panel 430 of the frame or housing 431 of the control station; the push button switches which have to do with initiating or controlling movements of the various parts of the machine transversely of the machine, are arranged on the right-hand side panel 432 of the housing or frame 431, as viewed in Figs. 2 and 27; and the front panel 430 of the control station is always maintained in a plane parallel to the longitudinal axis of the machine and the side panel 432 is always maintained in a plane normal to the longitudinal axis of the machine irrespective of the angular position of the arm 26 about the pivot 29 by a parallel motion mechanism comprising a pair of parallel cables or rods 433 and 434, the rear ends of which are pivotally connected to pivot pins secured to the top of the column B, while the front ends thereof are pivotally connected to pins carried by a member 435 to which the flexible connection 27 is directly connected. The member 435 is rotatably supported in the free end of the arm 26.

In addition to the fact that all of the controls pertaining to longitudinal movements are arranged on the front panel, the push button switches which initiate or control movements toward the right are arranged along the right-hand side of the front panel 430 and the push button switches which initiate or control movements toward the left are arranged along the left-hand side of the front panel. In a similar manner, the push button switches which initiate or control rearward movements are arranged along the rear side of the side panel 432 and the push button switches which control movements toward the front are arranged along the front or left-hand side of the side panel. The push button switches which initiate or control upward movements are arranged on the front panel 430 and are located above the push button switches which control or initiate movements in a downward direction. Because of the fact that the control station H is suspended and freely movable in any direction, hand grasps 436, 437, and 438 are provided along the right-hand front corner and two sides of the bottom to facilitate handling thereof. The left-hand side of the housing 431 has a set-back which forms a shoulder 440. A similar set-back in the rear side of the housing forms a similar shoulder 441. These shoulders or set-backs, together with the hand grasp 436, permit the control station to be readily held while the push buttons are depressed. For example, the hand grasp 436 can be grasped by the fingers of the right hand while the push buttons adjacent to the right-hand side of the front panel 430 are being operated by the thumb. In a similar manner, the fingers of the left hand can be placed behind the offset while the push buttons along the left edge of the panel 430 are being operated by the thumb of the same hand. The push buttons located on the side panel 432 can be operated in a similar manner.

The electrical control station H has twenty-one push buttons and four selecting switches. The feed push buttons for the head, saddle, and table are arranged in groups and are located to give directional control. In other words, the button of each feed is on the side corresponding to the direction in which the feed will take place when the button is pressed. For instance, the saddle will feed to the left if the left-hand feed push button of the saddle group of push buttons is depressed. Each group has two continuous feed push buttons and two "inch" push buttons. In the center of each group is a selecting switch which, when turned on, makes the push buttons in that particular group operative and cuts out through relays all other groups of feed push buttons and selecting switches. The selecting switches also make operative only the limit switches for the particular unit or element selected and cut out the limit switches for the other units or elements. This prevents any possibility of a limit switch for one unit or element, for example, the head, interfering with the operation of any of the other units or elements, that is, the table, saddle, or spindle. This arrangement makes it possible to leave one or more of the units on a limit switch and move another unit as desired. When any one of the above-mentioned selecting switches is turned on, a white pilot light, located adjacent to that particular switch lights. This tells at a glance which group of push buttons is operative. The two continuous feed buttons in each group also have light bulbs therein which light when the push button is pressed momentarily and remain lighted so long as the feed is operating, that is, until the stop button is pressed. This indicates which unit is being fed and in what direction.

In the embodiment of the invention shown, the spindle head continuous feed and "inch" feed push buttons are designated by the reference characters 445 and 446, and 447 and 448, respectively. These buttons, together with the selecting switch 449 and the indicating light 450 associated therewith, are grouped together and the continued feed button 445 which causes the spindle head C to move in an upward direction is located above the continuous feed button 446 which initiates a continuous feed in a downward direction. The same is true of the "inch" push buttons 447 and 448. In a similar manner, the saddle continuous feed and "inch" feed buttons 451 and 452, and 453 and 454, and the selecting switch 455 and indicating light 456 associated therewith are grouped together adjacent to the lower end of the front panel 430 of the electrical control station H. Since the saddle E moves longitudinally of the machine, the push button 451 which initiates a movement of the saddle towards the right is located at the right-hand side of the panel 430, while the push button 452 which initiates a movement in the opposite direction is located adjacent to the left-hand side thereof. The same is true of the "inch" feed buttons 453 and 454.

The table continous feed and "inch" feed buttons 460 and 461, and 462 and 463, respectively, and the selecting switch 464 and the indicating light 465 associated therewith are located adjacent to the lower end of the right-hand side panel 432 of the electrical control station. Since the table F moves transversely of the machine, these buttons are grouped on the right-hand side panel of the control station, and the continuous feed button 460 which initiates a movement towards the rear is located to the rear side of the panel 432, while the continuous feed button 461 which initiates a movement of the table towards the front is located adjacent the front side of the panel. The same is true of the "inch" feed buttons 462 and 463. None of the continuous feed push button switches are operative unless the spindle is rotating.

The selecting switches 449, 455, and 464, besides separating electrically the particular unit selected from the other units, energizes the solenoids 112, 64, and 81, respectively, thus connecting the particular unit selected to the feed and rapid traverse motor 21, thus selecting the unit to be moved by power. The respective solenoid will remain energized so long as the selecting switch associated therewith is turned on except during the time that an "inch" feed push button switch 466, hereinafter specifically referred to, located on the bed A is depressed. All the controls located on the pendant control station H are rendered inoperative during the time the "inch" push button switch 466 is depressed. When the push button 466 is released, the pendant control station is again operative. The selection remains as it was prior to pushing the switch, but any continuous feed which may have been operating is no longer in operation, and if it is desired to continue the previous feed, it must again be started by depressing the particular feed push button in question. The first selecting switch operated makes the remaining selecting switches inoperative. To aid the springs 68, 89 and 115 in disengaging the respective clutches, one of the idle solenoids is momentarily energized, in a manner hereinafter described, when the feed stop button is depressed, thus pulling the clutch into a neutral position.

A single push button switch 467 is employed for controlling the rapid traverse movements of the head, saddle, and table. This push button switch 467 is located on the front panel 430 of the pendant control station and, upon being depressed, closes the circuit to the solenoid 41 through relays in a manner hereinafter referred to, connecting the shaft 52 to the motor 21 through the friction clutch L, etc. The rapid traverse is not effected unless the feed for the particular element or unit that it is desired to rapid traverse is in operation, and, when initiated the rapid traverse will be in the direction of the feed movement. Upon any of the continuous feed push button switches 445, 446, 451, 452, 460, or 461 being depressed, the circuit to the motor 21 is closed and remains closed until a stop feed push button switch 468 is depressed.

The fourth selecting switch 469 of the electrical control station H is the spindle feed directional switch. When this switch is turned to the right, the spindle feed, when operated, will be to the right, and when turned to the left, the direction of feed will be to the left. The spindle feed is initiated by a spindle feed push button switch 470 located adjacent the selecting switch 469, both of which switches are located adjacent to the upper end of the front panel of the electrical control station H. Depressing the spindle feed push button 470 energizes one or the other of the solenoids 311 and 312, depending upon which direction of feed has been selected. Once the push button 470 has been depressed after the spindle feed directional switch 469 has been turned on, the circuit to the particular solenoid energized remains closed until the feed stop push button switch 468 is depressed. The spindle start push button switch 470 has a light therein which is energized while the feed is operating, similar to the continuous feed push button switch previously referred to.

When the jaw clutch 310 is in neutral position, the spindle 19 can be fed by hand by the spindle feed hand wheel 350 or the crank 351. To aid the springs 308 and 309 in returning the movable clutch element 307 to its neutral position when the feed stop button 468 is depressed, the feed solenoid other than the one just energized is momentarily energized in a manner hereinafter more specifically referred to. The spindle feed is driven from the gear 276 fixed to the spindle sleeve 258 from which it follows that the feed will not start until the spindle is put into rotation even though the direction of feed has been selected by the selecting switch 469 and the spindle feed push button 470 is depressed. The spindle feed is not thrown out when the rotation of the spindle is stopped which is a desirable feature since it permits the operator to jog the spindle without the feed dropping out every time the jog push button switch 471 is operated. However, the spindle feed can be stopped or started without stopping the rotation of the spindle. This permits the cutter to clear itself when doing a facing operation. The spindle feed selecting switch 469 and the spindle feed push button switch 470 are so interlocked with the selecting switches 449, 455, and 464 that only one switch is operative at a time.

When the direction of rotation of the spindle is reversed the direction of feed for any given set-up would naturally be reversed since the feed is driven from the spindle sleeve or quill. The selecting switch 469 would then no longer indicate the feed direction, but this is prevented by so wiring the machine that, when the direction of rotation of the spindle is reversed, the spindle feed or directional solenoid which is energized at that time is deenergized and the feed is stopped. The reversing of the direction of rotation of the spindle also transposes the spindle feed solenoids 311 and 312 so that when the spindle feed switch 470 is again depressed, the opposite solenoid will be energized and the feed will be in the same direction as previously selected. The construction is such that the selecting switch 469 always indicates the direction of the spindle feed regardless of the direction of rotation of the spindle.

The two push buttons 474 and 475 for controlling the rapid traverse motor 24 are so mounted in the front panel 430 of the electrical control station H that when the right-hand button 474 is depressed, the spindle will be rapid-traversed to the right, and when the left-hand button 475 is depressed, the spindle will be rapid-traversed to the left. To make the spindle rapid traverse push buttons operative the spindle feed selecting switch 469 must be in one of its "on" positions. The construction is such that the spindle may be rapid-traversed in either direction irrespective of whether the spindle is rotating or not. The rapid traverse push buttons 474 and 475 always move the spindle in the direction indicated, that is, the button on the right always moves the spindle to the right and the button on the left always moves the spindle to the left irrespective of the direction of spindle feed selected by the spindle feed direction selecting switch 469. This is accomplished by having the spindle feed solenoid relays control the direction of rotation of the spindle rapid traverse motor 24.

Continuous rotation of the spindle 19 is controlled by three push button switches 476, 477 and 478. The first two button switches 476 and 477 cause the spindle to rotate in opposite directions, either up in front or down in front, respectively. The third button switch 478 stops the motor 23. In addition to stopping the motor 23, depressing the push button switch 478 also stops the motor 21. The push button switch 471 jogs the spindle down in front only. Among other things, jogging the spindle is used to aid the shifting of the change gears. The jogging push button 466 previously referred to jogs both the main and the rapid traverse and feed motors 21 and 23 and is located convenient to the change gear levers. When the push button 466 is depressed slightly, all feeds are thrown out and the rotation of all motors is stopped. When depressed further, both motors start and continue to run as long as the button is held in its extreme depressed position. When released, the motors will stop. The fact that the head, saddle, and table clutches are disengaged when the push button 466 is depressed, if they are not already disengaged, facilitates the shifting of the gears in the change feed transmission J.

Figs. 29, 30, 31, and 32 are wiring diagrams of the electrical hook-up of the machine. Referring to these figures, it will be seen that all the push button switches employed, with the exception of the push button switches 416, 417, 467, 468, 474, 475 and 478 are double-throw switches having two or more sets of contacts, one or more sets normally closed and the other set normally open. When the spindle reverse push button switch 476 is depressed, a circuit is completed from the line L—1 through wire 485, normally closed upper contacts of the jog push button switch 466, wire 486, normally closed contacts of the spindle stop push button switch 478, wire 487, normally closed contacts of the spindle jog push button switch 471, wire 488, normally closed contacts of the spindle forward push button switch 477, wire 489, normally open contacts of the push button switch 476, wire 490, operating solenoid 491 of relay 492, wire 493, overload contacts 494 on motor control panel 495 which controls the motor 23, and wire 496 to line L—2.

Energization of the solenoid 491 closes the normally open contacts 497 and 498 of relay 492, the former of which completes a circuit from the line L—1 through the wire 485, normally open contacts of jog push button switch 466, wire 486, normally closed contacts of spindle stop push button switch 478, wire 487, normally closed contacts of jog push button switch 471, wire 488, normally closed contacts of spindle forward push button switch 477, wire 489, contacts 497 of relay 492, wire 500, operating solenoid 501 of motor control panel 495, wire 493, overload contacts 494 of motor control panel 495, and wire 496 to L—2, thus energizing the operating solenoid 501 of motor control panel 495, closing the main contacts 502, 503 and 504 connecting the motor 23 to the main line L—1, L—2, and L—3, causing the motor to rotate in a direction to rotate the spindle 19 up in front, commonly referred to as reverse. The second set of contacts 498 of relay 492 complete a holding-in circuit for the solenoid 491 of the relay 492 through the normally closed contacts of the spindle forward push button 477, wire 489, contacts 498, wire 490, etc., which maintains the relay closed after the push button switch 476 has been released. The motor 23 continues to rotate in a reverse direction until the solenoid 501 of the motor control panel 495 is deenergized, which may be accomplished by slightly depressing either of the jog push button switches 466 or 471, or the spindle stop push button switch 478 on the pendant control, either of which switches breaks the circuit to the solenoid 501.

To rotate the main motor 23 and in turn the spindle 19 in the forward direction, the spindle forward push button switch 477 is depressed, closing the normally open contacts thereof and completing a circuit from the line L—1 through the wire 485, the normally closed contacts of the jog push button switch 466, wire 486, normally closed contacts of stop push button switch 478, wire 487, normally closed contacts of jog push button switch 471, wire 488, normally closed contacts of spindle reverse push button switch 476, wire 505, normally open contacts of spindle forward push button switch 477, wire 506, operating solenoid 507 of relay 508, wire 493, overload contacts 494 of motor control panel 495 and wire 496 to L—2. Energization of the operating solenoid 507 of relay 508 closes the normally open contacts 509, 510, 511 and 512, and opens the normally closed contacts 513 and 514. The closing of the normally open contacts 509 of relay 508 completes a circuit from the line L—1 through the wire 485, normally closed contacts of jog push button switch 466, wire 486, normally closed contacts of stop push button switch 478, wire 487, normally closed contacts of jog push button switch 471, wire 488, normally closed contacts of spindle reverse push button switch 476, wire 505, contacts 509, wire 516, operating solenoid 517 of motor control panel 495, wire 493, normally closed overload contacts 494 of motor control panel 495 and wire 496 to L—2. Energization of the operating solenoid 517 of motor control panel 495 closes the main contacts 518, 519, and 520 thereof, connecting the motor 23 to the line, causing it to rotate in a direction to rotate the spindle down in front, commonly referred to as forward. The motor 23 continues to rotate the spindle in the forward direction until the operating solenoid 517 of the motor control panel 495 is deenergized in a manner previously referred to.

The spindle may be jogged in a forward direction by depressing the spindle jog push button switch 471 to close the normally open contacts thereof. When the normally open contacts of the spindle jog push button switch 471 are closed, a circuit is completed from the line L—1 through the wire 485, normally closed contacts of jog push button switch 466, wire 486, normally closed contacts of spindle stop push button switch 478, wire 487, normally open contacts of jog push button switch 471, wire 500, operating solenoid 501 of motor control panel 495, wire 493, normally closed overload contacts 494 of motor control panel 495, and wire 496 to line L—2. Energization of the operating solenoid 500 of motor control panel 495 closes the main contacts 502, 503 and 504 connecting the motor 23 to the line in such a manner that the motor rotates in a direction to rotate the spindle in a forward direction. The motor continues to operate as long as the jog push button switch 471 is depressed sufficiently to hold the normally open contacts thereof closed. The spindle rotation push button switches 476, 477 and the jog push button switch 471 are so interlocked (see Fig. 29) that when the spindle is rotating continuously in either direction and it is desired to reverse the direction of rotation of the spindle, it is merely necessary to depress the desired push button switch as this breaks the circuit under the control of which the spindle was previously rotating. This clearly prevents the simultaneous closing of both sets of main contacts of the motor control panel 495.

When the jog push button switch 471 is slightly depressed, the motor 23 also stops if it happens to be rotating at that time, irrespective of the direction of rotation. When the normally open contacts of the jog push button switch 471 are closed the motor will rotate the spindle in a forward direction so long as the normally open contacts of the jog push button switch 471 are maintained closed. After jogging the spindle by the jog push button switch 471, the continuous rotation of the spindle can only be started by depressing one or the other of the continuous push button switches 476 or 477, depending upon which direction it is desired to rotate the spindle.

The motor 23 can also be jogged by depressing the jog push button switch 466 located on the base of the machine far enough to close the normally open contacts thereof. The closing of these contacts establishes a circuit from the line L—1 through the wire 485, normally open contacts of jog push button switch 466, wire 521, operating solenoid 522 of relay 523, wire 524 to L—2. The energization of the operating solenoid 522 of relay 523 closes the normally open contacts 525, 526, and 527 thereof, the former of which closes a circuit from the line L—1 through the wire 485, normally open contacts of jog push button switch 466, wire 521, contacts 525, wire 500, operating solenoid 501 of the motor control panel 495, wire 493, normally closed overload contacts 494 of motor control panel 495, and wire 496 to line L—2. Energization of the operating solenoid 501 of motor control panel 495 operates the main contacts 502, 503, and 504 thereof to connect the motor 23 to the line to rotate the spindle forward. The closing of contacts 526 and 527 of relay 523 establishes circuits hereinafter more specifically referred to, which causes the feed and rapid traverse motor 21 to rotate. When the jog push button switch 466 is released the circuits referred to are broken and the operation of the motors 21 and 23 discontinued.

The motor 23 is so constructed and wired that when the rotation thereof is stopped by depressing either of the push button switches 466, 471, 476, 477 or 478, the motor is instantaneously brought to rest by being momentarily connected to the line in such a manner that it tends to rotate in the opposite direction. This is commonly referred to in the art as "plugging" and is accomplished in the present instance by a switch 530, commonly known as a "plugger" comprising two sets of contacts 531 and 532 adapted to be selectively closed while the rotor of the motor is rotating depending upon the direction of rotation. In the present instance when the motor is rotating the spindle 19 in reverse, the contacts 531 are closed, whereas when the motor is rotating in forward, the contacts 532 are closed. The contacts 531 of the "plugger" 530 are in series circuit with a normally closed set of contacts 533 adapted to be opened upon energization of the operating solenoid 501 of the motor control panel 495. When the spindle stop push button switch 478, or, in fact, any of the push button switches which stop the rotation of the motor 23, is depressed, with the motor rotating in the reverse direction, the operating solenoid 501 is deenergized and the motor disconnected from the line. Deenergization of the operating solenoid 501 allows the contacts 533 to close which completes a circuit from the line L—1 through wire 485, normally closed contacts of the jog push button switch 466, wire 486, normally closed contacts of spindle stop push button switch 478, wire 487, normally closed contacts of spindle jog push button switch 471, wire 488, contacts 531, wire 534, contacts 533, wire 516, operating solenoid 517 of motor control panel 495, wire 493, normally closed overload contacts 494, and wire 496 to line L—2 so long as the motor 23 continues to rotate in a forward direction. Energization of the operating solenoid 517 of the motor control panel 495 closes the main contacts 518, 519 and 520 which tends to rotate the motor in the opposite direction. As soon as the motor comes to rest, which is instantaneously, contacts 531 of "plugger" 530 open, breaking the circuit to the operating solenoid 517 disconnecting the motor from the line.

The contacts 532 of the "plugger" 530 are in series circuit with a normally closed set of contacts 535 adapted to be opened upon energization of the operating solenoid 517 of the motor control panel 495. When the spindle stop push button switch 478 is depressed with the motor rotating in the forward direction, the operating solenoid 517 is deenergized and the motor disconnected from the line. Deenergization of the operating solenoid 517 allows the contacts 535 to close, establishing a circuit from the line L—1 through wire 485, normally closed contacts of the "jog" push button switch 466, wire 486, normally closed contacts of the spindle stop push button switch 478, wire 487, normally closed contacts of spindle jog push button switch 471, wire 488, contacts 532, wire 536, contacts 535, wire 500, operating solenoid 501 of motor control panel 495, wire 493, normally closed overload contacts 494, and wire 496 to line L—2 so long as the motor 23 continues to rotate in a forward direction. Energization of the operating coil 501 of the motor control panel 495 closes the main contacts 502, 503, and 504, which tend to rotate the motor in the opposite direction. As soon as the motor comes to rest, which is instantaneously, contacts 532 of "plugger" 530 open, breaking the circuit to the operating solenoid 501, disconnecting the motor from the line. When the motor 23 is stopped by depressing either of the push button switches 466, 471 or 478, irrespective of the direction of rotation, the motor coasts or, in other words, the plugging is not effected until the push button is released, since these switches are in series with both sets of contacts of the "plugger" 530.

The spindle feed directional and the spindle rapid traverse controls are so designed that when the switch 469 is turned to the right, as viewed in Figs. 27 and 29, or in other words, when the contacts 537 thereof are closed, the spindle feed is to the right regardless of the direction of rotation of the spindle. When the directional switch 469 is turned to the left-hand "on" position, that is, in a position to close the contacts 538, the spindle feed is to the left, likewise, regardless of the direction of rotation of the spindle 19. This is accomplished through the medium of the contacts 511, 512, 513 and 514 of the relay 508, the former two of which contacts are normally open, while the latter two are normally closed. The operating solenoid 507 of the relay 508, as previously explained, is energized when the spindle is rotating in a forward direction and when energized causes a transposition of the control wires to relays 539 and 540, which in turn control the energization of the clutch operating solenoids 311 and 312, respectively. The spindle rapid traverse push button switches 474 and 475 always rapid traverse the spindle in the same direction regardless of the position of the direction switch 469, or the direction of rotation of the spindle 19. This is accomplished by a transposition of the control wires by the relays 539 and 540 to the operating solenoids 541 and 542 of the motor control panel 543 for the spindle rapid traverse motor 24. However, the switch 469 must be in one or the other of its two "on" positions before the rapid traverse push button switches 474 or 475 are operative.

With the foregoing in mind, the spindle 19 may be fed towards the right, or in a forward direction, by first turning the feed direction selecting switch 469 to its right-hand "on" position, and subsequently depressing the spindle feed push button 470. Turning the directional selecting switch 469 to the right, closes the contacts 537 thereof, and upon depressing the spindle feed push button switch 470 a circuit is established from the line L—1 through the wire 485, normally closed contacts of jog push button switch 466, wire 486, normally closed contacts of stop all feeds push button switch 468, wire 648, normally closed contacts 544 of relay 545, wire 546, normally closed contact 547 of relay 548, wire 549, normally closed contact 550 of relay 551, wire 552, contacts of spindle start push button 470, wire 553, operating solenoid 554 of relay 555, wire 556, limit switch 371, wire 557, limit switch 558 on the head extension 272, and wire 559 to L—2. At the same time a circuit is completed from wire 553 through the operating solenoid 560 of relay 561, wire 562, limit switch 563 on the head extension 272, wire 564, limit switch 372, and wire 559 to L—2, which circuit is connected in parallel with the circuit through the operating solenoid 554 of relay 555 and the limit switches 371 and 358. Simultaneously, a third circuit is completed from the wire 553, through transformer 566 and wire 559 to the line L—2. The secondary of the transformer 566 is connected by the wires 569 and 570 to the indicating light 571 located in the spindle feed start push button switch 470. While the spindle 19 is being fed the light 571 is energized regardless of the direction of feed.

Energization of the operating solenoids 554 and 560 of the relays 555 and 561, respectively, closes the normally open contacts 572 of relay 555 and the normally open contacts 573 of relay 561 in series circuit with the contacts 537 and 538, respectively, of the direction selecting switch 469. The closing of the normally open contacts 573 of relay 561 has no effect on the circuit, since these contacts are in series with contacts 538 of the direction selecting switch 469 which are now open.

The closing of the normally open contacts 572 of the relay 555 establishes a circuit from the wire 553 through contacts 537, wire 574, contacts 572, wire 575, normally closed contacts 514 of relay 508, wire 577, operating solenoid 578 of relay 540, and wire 559 to L—2. Energization of the operating solenoid 578 of relay 540 closes the normally open contacts 580, 581, 582, and 583 and opens the normally closed contacts 584 thereof.

The closing of the normally open contacts 582 of relay 540 completes a circuit from the wire 577, through the contacts 582, wire 585, solenoid 312, and wire 559 to L—2. Energization of the solenoid 312 shifts the movable clutch element 307 to the right, as viewed in Fig. 19, that is, in a direction to feed the spindle to the right when the spindle is rotating in the reverse direction. The closing of the normally open contacts 583 of relay 540 establishes a holding circuit for the relays 555 and 561 from the wire 552, through the contacts 583, wire 553, operating solenoids 554 and 560 of relays 555 and 561, respectively, and the limit switches 371, 558 and 563, 372, respectively. The holding circuit just referred to continues the feed after the spindle feed push button switch 470 is released. The spindle continues to feed forward until the holding circuit for relay 555 is broken either by the opening of one of the limit switches 371 or 558 by the direction selecting switch 469 being returned to its "off" position, or by the jog push button switch 466 or the stop all feeds push button switch 468 being depressed.

When the holding circuit for the relay 555 is broken, the operating circuit for the solenoid 312 is in turn broken and the movable clutch element 307 allowed to return to its neutral position under the action of the spring 309. In the event that the spring does not return the clutch element to its neutral position and in the event that the holding circuit for the relay 555 has been broken by any of the means heretofore mentioned other than the jog push button switch 466 located on the frame of the machine or in the event the circuit has been broken by this push button switch and the push button has subsequently been released, a circuit is established from wire 486 through the normally closed contacts 587 of the relay 539, wire 588, normally closed contacts 584 of relay 540, wire 589, normally open limit switch 329, which is now closed as the spring 309 has not returned the movable clutch element 307 to its neutral position, wire 590, solenoid 311, and wire 559 to L—2. Energization of the solenoid 311 actuates the armature thereof to return the movable clutch element 307 to neutral position. As soon as the clutch element 307 is again in neutral position, the limit switch 329 opens, breaking the circuit to the solenoid 311 and deenergizing the same.

Assuming that the spindle is rotating in the forward direction and that the feed direction selecting switch 469 is in its right-hand "on" position with the contacts 537 thereof closed, when the spindle feed start push button switch 470 is depressed, the spindle will feed towards the right, even though the direction of rotation of the spindle is reversed. This is accomplished by the relay 508, the operating solenoid 507 of which is energized while the spindle is rotating in the forward direction, as previously explained.

Energization of the operating coil 507 of relay 508 opens the normally closed contacts 513 and 514 and closes the normally open contacts 511 and 512 thereof, connecting the wire 575 to wire 591 instead of to wire 577, as is the case when the spindle is rotating in reverse. When the spindle feed start push button switch 470 is depressed this establishes a circuit in addition to the circuits established through the relays 555 and 561, from the wire 553 through contacts 537 of direction selecting switch 469, contacts 572 of relay 555, contacts 512 of relay 508, wire 591, operating solenoid 592 of relay 539, and wire 559 to line L—2. Energization of the operating solenoid 592 of relay 539 opens the normally closed contact 587 and closes the normally open contacts 593, 594, 595 and 596 thereof. The closing of contacts 595 of relay 539 establishes a circuit from the wire 591, through contacts 595, wire 590, solenoid 311, and wire 559 to L—2, energizing the solenoid 311 and shifting the movable clutch element 307 towards the left, as viewed in Fig. 19, thus operatively connecting the gear 303 with the shaft 300. This would ordinarily rotate the lead screw 371 in the reverse direction, but since the direction of rotation of the spindle 19 has been reversed, the feed is forward or to the right. The closing of contacts 596 establishes a holding circuit for relay 555 from wire 552 through contacts 596 to wire 553, thus maintaining the operating solenoid 554 of relay 555 energized and also maintaining the solenoid 311 and the indicating transformer 566 energized. The spindle continues to feed towards the right as long as it is rotated until the holding circuit just mentioned is broken by either depressing the stop all feeds push button switch 468 or the jog push button switch 466 on the base of the machine by returning the direction selecting switch 469 to "off" position, or by the opening of either of the limit switches 371 or 558.

When the holding circuit for the relay 555 is broken, the operating circuit for the solenoid 311 is in turn broken and the movable clutch element 307 allowed to return to its neutral position under the action of the spring 308. In the event that the spring 308 does not return the clutch element 307 to its neutral position, and in the event that the holding circuit for the relay 555 has been broken by any of the means heretofore referred to other than the jog push button switch 466 located on the frame of the machine, or in the event the circuit has been broken by this push button switch and the push button has been subsequently released, a circuit is established from wire 486 through the normally closed contacts 587 of the relay 539, wire 588, normally closed contacts 584 of relay 540, wire 589, normally open limit switch 328, which is now closed as the spring 308 has not returned the movable clutch element 307 to its neutral position, wire 585, solenoid 312, and wire 559 to L—2. Energization of the solenoid 312 actuates the armature thereof to return the movable clutch element 307 to neutral position. As soon as the clutch element 307 is again in neutral position, the limit switch 328 opens, breaking the circuit to the solenoid 312 and deenergizing the same.

Assuming now that it is desired to feed the spindle in the reverse direction or towards the left, the spindle feed selecting switch 469 is turned to its left "on" position closing the contacts 538 thereof. The spindle feed start push button switch 470 when depressed, establishes a circuit from the wire 552 through contacts of spindle start push button 470, wire 553, operating solenoid 554 of relay 555, wire 556, limit switch 371, wire 557, limit switch 558 on the head extension 272, and wire 559 to L—2. At the same time a circuit is completed from wire 553 through the operating solenoid 560 of relay 561, wire 562, limit switch 563 on the head extension 272, wire 564, limit switch 372, and wire 559 to L—2, which circuit is connected in parallel with the circuit through the operating solenoid 554 of relay 555 and the limit switches 371 and 358. Simultaneously, a third circuit is completed from the wire 553, through the transformer 566 and wire 559 to the line L—2.

As previously stated, energization of the operating solenoids 554 and 560 of the relays 555 and 561, respectively, closes the normally open contacts 572 of relay 555 and the normally open contacts 573 of relay 561 in series circuit with the contacts 537 and 538, respectively, of the direction selecting switch 469. The closing of the normally open contacts 572 of relay 555 has no effect on the circuit since these contacts are in series with contacts 537 of the direction selecting switch 469 which are now open.

The closing of the normally open contacts 573 of the relay 561 establishes a circuit from the wire 552 through spindle feed start push button 470, wire 553, contacts 538, wire 597, contacts 573, wire 598, normally closed contacts 513 of relay 508, wire 591, operating solenoid 592 of relay 539, and wire 559 to L—2. Energization of the operating solenoid 592 of relay 539 closes the normally open contacts 593, 594, 595, and 596 thereof and opens the normally closed contacts 587 thereof. The closing of the normally open contacts 595 of relay 539 completes a circuit from the wire 591, through the contacts 595, wire 590, solenoid 311, and wire 559 to L—2. Energization of the solenoid 311 shifts the movable clutch element 307 to the left, as viewed in Fig. 19, that is, in a direction to feed the spindle to the left when the spindle is rotating in reverse. The closing of the normally open contacts 596 of relay 539 establishes a holding circuit for the relays 555 and 561 from the wire 552, through the contacts 596, wire 553, operating solenoids 554 and 560 of relays 555 and 561, respectively, and the limit switches 371, 558, and 563, 372, respectively. The holding circuit just referred to continues the feed after the spindle feed push button 470 is released. The spindle continues to feed to the left until the holding circuit for relay 561 is broken either by the opening of one of the limit switches 372 or 563 by returning the feed direction selecting switch 469 to "off" position, or by depressing either the jog push button switch 466 or the stop all feeds push button switch 468.

When the holding circuit for the relay 561 is broken, the operating circuit for the solenoid 311 is in turn broken and the movable clutch element 307 allowed to return to its neutral position under the action of the spring 309. In the event that the spring does not return the clutch element to its neutral position and in the event that the holding circuit for the relay 561 has been broken by any of the means heretofore mentioned other than the inch push button switch 466 located on the frame of the machine, or in the event the circuit has been broken by this push button switch and the push button has been subsequently released, a circuit is completed from the wire 486, through the normally closed contacts 587 of the relay 539, wire 588, normally closed contacts 584 of relay 540, wire 589, normally open limit switch 328, which is now closed as the spring 309 has not returned the movable clutch element 307 to its neutral position, wire 585, solenoid 312, and wire 559 to L—2. Energization of the solenoid 312 actuates the armature thereof to return the movable clutch element 307 to neutral position. As soon as the clutch element 307 is again in neutral position, the limit switch 328 opens, breaking the circuit to the solenoid 312 and deenergizing the same.

Assuming that the direction of rotation of the spindle 19 is reversed, nevertheless the direction of feed will be to the left when the spindle feed start push button switch 470 is depressed, so long as the feed direction selecting switch 469 is in its left-hand "on" position with the contacts 538 thereof closed. This is accomplished by the relay 508 in the manner similar to that referred to with reference to the feed towards the right. The operating solenoid 507 of the relay 508 is energized when the spindle is rotating in the forward direction, as previously explained, which opens the normally closed contact 513 and closes the normally open contact 511 connecting the wire 598 to wire 577 instead of wire 591. In this event when the spindle feed start push button 470 is depressed, in addition to the circuits established through the relays 555 and 561, a circuit is established from the wire 553 through contacts 538 of direction selecting switch 469, contacts 573 of relay 561, contacts 511 of relay 508, wire 577, operating solenoid 578 of relay 540, and wire 559 to line L—2. Energization of the operating solenoid 578 of relay 540 opens the normally closed contact 584 and closes the normally open contacts 582 and 583 thereof. The closing of contacts 582 establishes a circuit from the wire 577, through the contacts 582, wire 585, solenoid 312, and wire 559 to L—2, energizing the solenoid 312 and shifting the movable clutch element 307 towards the right, as viewed in Fig. 19, thus operatively connecting the gear 305 with the shaft 309. This would ordinarily rotate the lead screw 371 in the reverse direction, but since the direction of rotation of the spindle 19 has been reversed, the feed is still to the left. The closing of contacts 583 establishes a holding circuit for relay 561 from wire 552 through contacts 583 to wire 553, thus maintaining the operating solenoid 560 of relay 561 energized and also maintaining the solenoid 312 and the indicating transformer 566 energized. The spindle continues to feed towards the left until the holding circuit just mentioned is broken by either depressing the stop push button switch 468 or the jog push button switch 466 by returning the feed direction selecting switch 469 to its "off" position, or by the opening of either of the limit switches 371 or 558.

When the holding circuit for the relay 561 is broken, the operating circuit for the solenoid 312 is in turn broken and the movable clutch element 307 allowed to return to its neutral position under the action of the spring 308. In the event that the spring 308 does not return the clutch element 307 to its neutral position and in the event that the holding circuit for the relay 561 has been broken by any of the means heretofore referred to other than the jog push button switch 466 located on the frame of the machine or in the event the circuit has been broken by this push button switch and the push button has subsequently been released, a circuit is completed through the normally closed contacts 587 of the relay 539, wire 588, the normally closed contacts 584 of relay 540, wire 589, normally open limit switch 329, which is now closed as the spring 308 has not returned the movable clutch element 307 to its neutral position, wire 590, solenoid 311, and wire 559 to L—2. Energization of the solenoid 311 actuates the armature thereof to return the movable clutch element 307 to neutral position. As soon as the clutch element 307 is again in neutral position, the limit switch 329 opens, breaking the circuit to the solenoid 311 and deenergizing the same.

*Spindle rapid traverse*

The spindle 19 cannot be rapid traversed in either direction unless the direction selecting switch 469 is in one of its "on" positions and the spindle feed start push button 470 depressed, since the normally open contacts 600 of relay 555 are in series with the normally open contacts of spindle rapid traverse push button 474 and normally open contacts 601 of relay 561 are in series with the normally open contacts of rapid traverse push button switch 475. With the direction selecting switch 469 in either "on" position and the spindle start push button switch 470 depressed, the spindle can be rapid traversed towards the right by depressing the right-hand spindle rapid traverse push button switch 474 and towards the left by depressing the left-hand spindle rapid traverse push button 475. It is immaterial in which of the "on" positions the direction selecting switch 469 is positioned since either position actuates both relays 555 and 561. The spindle feed start push button 470 must have been closed or depressed in order to make the rapid traverse operative since the rapid traverse push button switches 474 and 475 are in series circuit with normally open contacts of relays 539 and 540 and these relays can only be actuated to close the normally open contacts thereof by depressing the spindle feed start push button 470. After the spindle feed push button switch 470 is initially closed, holding circuits heretofore referred to, maintain the operating solenoids of the particular relay selected by the direction selecting switch 469 energized.

Assuming that the direction selecting switch 469 has been turned to its right-hand "on" position and the contacts 537 thereof closed and that the spindle feed start push button switch 470 has been depressed, the depressing of the right-hand spindle rapid traverse push button switch 474 to rapid traverse the spindle towards the right closes the normally open contacts thereof establishing a circuit from the line L—1 through the wire 485, normally closed contacts of jog push button switch 466, wire 486, normally open contacts of spindle rapid traverse push button switch 474, wire 602, normally open contacts 600 of relay 555 which are now closed, wire 603, normally open contacts 580 of relay 540 which are now closed, wire 604, operating solenoid 541 of spindle rapid traverse motor control panel 543, wire 605, normally closed overload contacts 606 of spindle rapid traverse motor control panel 543, and wire 559 to L—2. This energizes the operating solenoid 541 of rapid traverse motor control panel 543, closing the main contacts 607, 608 and 609, connecting the motor 24 to the line, causing the motor to rotate in a direction to rapid traverse the spindle to the right. Operation of the motor 24 continues until the rapid traverse push button switch 474 is released whereupon the rapid traverse of the spindle stops.

In the event that the spindle feed direction switch 469 is in its left-hand "on" position with the contacts 538 thereof closed, when the spindle rapid traverse push button switch 474 is depressed after the spindle feed start push button switch 470 has been closed, the spindle will, nevertheless, be rapid traversed towards the right, since in this event the operating solenoid 592 of the relay 539 will be energized rather than the operating solenoid 578 of the relay 540. When the right-hand spindle rapid traverse push button switch 474 is depressed, under these circumstances a circuit is established from the line L—1 through the wire 485, normally closed contacts of jog push button switch 466, wire 486, push button switch 474, wire 602, contacts 600 of relay 555 which contacts are now closed, wire 603, contacts 593 of relay 539 which contacts are now closed, wire 610, operating solenoid 542 of rapid traverse motor control panel 543, wire 605, normally closed overload contacts 606, and wire 559 to line L—2. Energization of the operating solenoid 542 of motor control panel 543 closes the main contacts 611, 612, 613, thereof, connecting the motor 24 to the line in such a manner that it rotates in the reverse direction but the direction in which the spindle is rapid traversed remains the same since the energization of the relay 539 instead of the relay 540 has in the interim reversed the position of the movable clutch element 307.

The spindle can be rapid traversed in the reverse direction or to the left in a manner similar to that in which it is rapid traversed towards the right by depressing the left-hand rapid traverse push button switch 475. When this push button switch is depressed with the spindle feed direction switch in its right-hand "on" position with the contacts 537 thereof closed and the other necessary circuits set up by depressing the spindle start push button switch 470, a circuit is established from the wire 486, normally open contacts of push button switch 475, wire 614, normally open contacts 601 of relay 561 which contacts are now closed, wire 615, contacts 581 of relay 540 which contacts are now closed, wire 610, operating solenoid 542 of relay of motor control panel 543, wire 605, etc., to line L—2. Energization of the operating solenoid 541 of the motor control panel 543 closes the main contacts 607, 608, 609 thereof, causing the motor 24 to rotate in a direction to rapid traverse the spindle to the left.

With the spindle feed direction control switch 469 in the opposite "on" position, that is, with the contacts 538 thereof closed, depressing the left-hand spindle rapid traverse push button switch 475, establishes a circuit from the wire 486, through the normally open contacts of push button switch 475, wire 614, contacts 601 of relay 561, wire 615, contacts 594 of relay 539, wire 604, operating solenoid 541 of motor control panel 543, wire 605, etc. to line L—2. Energization of the operating solenoid 541 of rapid traverse motor control panel 543 closes the main contacts 611, 612, and 613 thereof, causing the motor to rotate in a reverse direction, but since the movable clutch element 307 has been shifted to its opposite position by the opening of relay 540 and the closing of relay 539, the spindle moves towards the left.

The rapid traverse motor 24 is provided with a "plugger" for instantaneously stopping the rotation thereof when the circuit thereto is interrupted upon the opening of either of the limit switches 371, 372, 563, or 558 only, and not when the rapid traverse push buttons 474 and 475 are released. The "plugger" operates similar to the "plugger" described with reference to the main motor 23. Suffice it to say, in the present instance, the "plugger" is designated generally by the reference character 616. The normally open contacts 617 of the "plugger" 616 are connected in series circuit with the normally closed contacts 618 of the motor control panel 543, which contacts are operated simultaneously with the operation of the main contacts 607, 608 and 609 thereof. The normally open contacts 619 of the "plugger" 616 are in series with the normally closed contacts 620 of the motor control panel 543, which contacts are actuated simultaneously with the actuation of the main contacts 611, 612, and 613 of the motor control panel. When the motor 24 is operated by virtue of the fact that the main contacts 607, 608 and 609 are closed, the normally closed contacts 618 are opened and the normally open contacts 617 of the "plugger" 616 are closed. Upon the opening of the main contacts 607, 608 and 609 the contacts 618 are closed, establishing a circuit in the event one or more of the limit switches 371, 372, 563 and 588 have opened and, as long as the motor continues to rotate, from the wire 486, through either the normally closed contacts 621 of relay 555 or the normally closed contacts 622 of relay 561, one or the other of which relays 555 or 561 was deenergized to close the normally closed contacts thereof when the limit switch or switches were actuated, depending upon which limit switch operated, wire 623, contacts 617, wire 624, contacts 618, wire 610, solenoid 542, wire 605, etc., to line L—2, energizing the operating solenoid 542 of motor control panel 543, closing the main contacts 611, 612, and 613 of motor control panel 543, connecting the motor to the main line in a manner tending to rotate it in a reverse direction, thus instantaneously stopping the motor. As soon as the motor stops, the circuit is broken by the opening of the contacts 617 of the "plugger" 616. In a similar manner, when the motor is rotating by virtue of the main contacts 611, 612 and 613 of the motor control panel 543 being closed, upon the opening of these contacts through the actuation of one of the limit switches referred to, a circuit is completed from the wire 486, through either the normally closed contacts 621 of relay 555 or the normally closed contacts 622 of relay 561, wire 623, contacts 619 of plugger 616, wire 692, normally closed contacts 620 of motor control panel 543, wire 604, operating solenoid 541 of motor control panel 543, wire 605, etc. to line L—2. Energization of the operating solenoid 541 of motor control panel 543 connects the motor 24 to the main line in such a manner that it tends to rotate in a reverse direction, thus instantaneously stopping the same. When the motor stops, the circuit is broken by the opening of the contacts 619 of the plugger 616.

*Head, saddle and table feed and rapid traverse*

The feed and rapid traverse motor 21 is the common driving source for raising and lowering the head and moving both the saddle and the table, only one of which can be operated at the same time, as previously mentioned. To move the spindle head C and the backrest block G the selecting switch 449 is turned to its "on" position. This establishes a circuit from the line L—1 through the wire 485, normally closed contacts of jog push button switch 466, wire 486, normally closed contacts 587 of relay 539, wire 588, normally closed contacts 584 of relay 540, wire 589, selecting switch 449, wire 625, normally closed contacts 626 of motor control panel 627, hereinafter more specifically referred to, wire 628, operating solenoid 629 of relay 545, wire 631, normally closed contacts 632 of relay 548, wire 633, and normally closed contacts 634 of relay 551 to L—2. At the same time the operating solenoid 635 of relay 636 and the indicating light 450 are energized as they are connected in parallel with the operating solenoid 629 of relay 630. Energization of the operating solenoid 629 of relay 630 closes the normally open contacts 637, 638 and 639 and opens the normally closed contacts 544, 640 and 641 thereof. Energization of the operating solenoid 635 of relay 636 closes the normally open contacts 642, 643, 644, 645, and 646 thereof. The closing of the contacts 637 of relay 545 establishes a circuit from the wire 628, through the contacts 637, wire 647, and solenoid 112 to L—2. Energization of the solenoid 112 shifts the movable clutch element 106 to engage the clutch O and connect the vertical lead screws 18 and 20 with the motor 21.

The spindle head C and backrest block G can now be moved vertically by depressing either of the continuous push buttons 445 and 446 or either of the "inch" push buttons 447 and 448. Assuming that it is desired to move the spindle head continuously in an upward direction, the continuous "up" push button 445 is depressed, opening the normally closed contacts and closing the normally open contacts thereof. Closing of the normally open contacts establishes a circuit from the wire 486, through the feed stop push button switch 468, wire 648, contacts 644 of relay 636, wire 712, normally open contacts of push button switch 445, wire 650, operating solenoid 651, relay 652, wire 653, and either normally open contacts 654 or 655 of the motor control panel 495, depending upon the direction of rotation of the main driving motor 23, to line L—2. Energization of the operating solenoid 651 of relay 652 closes the normally open contacts 656, 657, 658, 659, and 660 thereof. The closing of contacts 656 of relay 652 closes a circuit from the wire 628 through the contacts 638 of relay 545, wire 661, transformer 662, wire 663, and contacts 656 to L—2, energizing the indicating light 664 located in the push button 445, which indicating light is connected to the secondary of the transformer 662 by the wires 665 and 666.

The closing of contacts 658 of relay 652 establishes a holding circuit for the relay from the wire 486, through the normally closed contacts of feed stop push button switch 468, wire 648, contacts 643 of relay 636, wire 667, normally closed contacts of push button switch 448, wire 668, normally closed contacts of push button switch 446, wire 669, contacts 658, operating solenoid 651 of relay 652, wire 653, and contacts 654 and 655 of motor control panel 495 to line L—2. This holding circuit maintains the operating solenoid of the relay 652 energized after the push button switch 445 has been released. The closing of contacts 657 of relay 652 completes a circuit from the wire 669, through the contacts 657, wire 670, operating solenoid 671 of motor control panel 672, wire 673, contacts 639 of relay 545, wire 674, normally closed limit switch 185, wire 675, and overload contacts 676 of motor control panel 672 to L—2. Energization of the operating solenoid 671 of the motor control panel 672 closes the main contacts 677, 678 and 679 thereof, connecting the feed and rapid traverse motor 21 to the main line in such a manner that the motor rotates in a direction to move the spindle head and backrest block in an upward direction.

The motor 21 continues to rotate so long as the holding circuit for the relay 652 is maintained and so long as the limit switch 185 remains closed. Upon the opening of the limit switch 185 or upon depressing the feed stop push button 468, the circuit to the operating solenoid 671 of the motor control panel 672 is broken and the motor 21 disconnected from the line. Opening of the limit switch 185 does not open the holding circuit for the relay 652 but depressing the feed stop push button 468 does. Deenergizing the operating solenoid 651 of the relay 652 opens the primary circuit to the transformer 662 and extinguishes the light 664.

With the selecting switch 449 turned on and the other selecting switches in their "off" position, the spindle head and backrest block can be inched up by depressing the upper "inch" push button switch 447. This closes a circuit from the wire 486, through the feed stop push button 468, wire 648, contacts 642 of relay 636, normally open contacts of push button switch 447, wire 670, operating solenoid 671 of motor control panel 672, etc. Energization of the operating solenoid 671 of the motor control panel 672 closes the main contacts 677, 678 and 679 thereof, causing the motor 21 to rotate in the same direction as previously referred to. The motor continues to rotate so long as the "inch" up push button switch 447 is depressed, provided the stop push button 468 is not depressed.

With the selecting switch 449 in its "on" position, the spindle head and backrest block can be moved continuously down by depressing the continuous down push button switch 446. This establishes a circuit from the wire 486, through the normally closed contacts of the feed stop push button switch 468, wire 648, contacts 645 of relay 636, wire 680, normally open contacts of continuous down push button switch 446, wire 681, operating solenoid 682 of relay 683, wire 653, and either contacts 654 or 655 of motor control panel 495 to L—2. Energization of the operating solenoid 682 of relay 683 closes the normally open contacts 684, 685, 686, 687 and 688 thereof. The closing of contacts 688 of relay 683 establishes a circuit from the wire 589, through the selecting switch 449, wire 625, normally closed contacts 626 of motor control panel 627, wire 628, contacts 638 of relay 545, wire 661, transformer 689, wire 690, and contacts 688 to L—2. Energization of transformer 689 energizes the indicating lamp 691 in the continuous down push button switch, which is connected to the secondary of the transformer 689 by the wires 666 and 693.

The closing of contacts 687 of relay 683 completes a holding circuit therefor from the wire 589, through the normally closed contacts of stop push button switch 468, wire 648, normally open contacts 642 of relay 636, wire 694, normally closed contacts of "inch" up push button switch 447, wire 695, normally closed contacts of continuous up push button switch 445, wire 696, contacts 687, wire 681, operating solenoid 682 of relay 683, wire 653, and contacts 654 or 655 to line L—2. This holding circuit maintains the relay 683 energized after the continuous down stop push button switch 446 has been released. The closing of contacts 686 of relay 683 completes a circuit from wire 696, through contacts 686, wire 697, operating solenoid 698 of motor control panel 672, wire 699, contacts 646 of relay 636, wire 700, limit switch 186, wire 675, and overload contacts 676 of motor control panel 672 to L—2. Energization of the operating solenoid 698 of motor control panel 672 closes the main contacts 701, 702, and 703 thereof, connecting the motor 21 to the line in such a manner that it rotates in a reverse direction, that is, in a direction to lower the spindle head and backrest block. The motor continues to operate until the limit switch 186 is opened by the spindle head reaching the end of its travel or until the feed stop push button switch 468 is depressed. In the event the motor is stopped by the opening of the limit switch 186, the relay 683 remains closed, but in the event the motor is stopped by depressing the feed stop push button 468, the holding circuit for the relay 683 is broken and the indicating lamp 691 is extinguished.

The spindle head and backrest block which move as a unit can be inched down by depressing the "inch" down push button switch 448 closing the normally open contacts thereof. This establishes a circuit from the wire 486, through the normally closed contacts of push button switch 468, wire 648, normally open contacts 643 of relay 636, wire 667, normally open contacts of "inch" down push button switch 448, wire 697, operating solenoid 698 of motor control panel 672, wire 699, normally open contacts 646 of relay 636, wire 700, limit switch 186, wire 675 and normally closed overload contacts 676 of motor control panel 672 to L—2. Energization of the operating solenoid 698 of the motor control panel 672 causes the main contacts 701, 702, and 703 thereof to close, connecting the motor to the line. The motor continues to operate so long as the "inch" down push button switch 448 is depressed sufficient to hold the normally open contacts thereof closed or until the limit switch 185 opens.

The spindle 19 must be rotating, otherwise the spindle head and back rest block, saddle, and table cannot be moved since the contacts 654 and 655, which are in series with the selecting switches 449, 455, and 464 are only closed when the main motor 23 is rotating in one direction or the other. The spindle head and back rest block cannot be rapid traversed unless the feed and rapid traverse motor 21 is rotating. With the motors 23 and 21 rotating, the spindle head and back rest block can be rapid traversed in either direction, depending upon the direction of rotation of the motor 21 by merely depressing the normally open rapid traverse push button switch 467 to close the contacts thereof. This establishes a circuit from the wire 589, through the normally open contacts of the rapid traverse push button switch 467, wire 704, and solenoid 41 to L—2. Energization of the solenoid 41 engages the normally disengaged friction clutch L, causing the lead screws 18 and 20 to be rotated at a comparatively high rate of speed through the overrunning clutch device K. When the rapid traverse push button switch 467 is released, the solenoid 41 is deenergized and the friction clutch L disengaged, thus stopping the rapid traverse movement.

The motor 21, like the motors 23 and 24 heretofore referred to, is provided with a "plugger" for bringing the same to rest instantaneously upon being disconnected from the line. The "plugger" designated generally by the reference character 705 comprises normally open contacts 706 adapted to be closed when the motor is rotating in the direction to move the spindle head upward and normally open contacts 707 adapted to be closed when the motor 21 is rotating in the direction to move the spindle head downward. When the motor is rotating in a forward direction, that is, in a direction to move the spindle head upward, the main contacts 677, 678 and 679 are closed and normally closed contacts 708 which operate therewith under the influence of the operating solenoid 671 are open. These contacts 708 are in series with the contacts 706 of the plugger 705. As soon as the motor 21 is disconnected from the line, the contacts 708 close, completing a circuit from the wire 589, through the contacts 706, wire 709, contacts 708, wire 697, operating solenoid 698 of motor control panel 672, wire 699, normally open contacts 646 of relay 636, wire 700, limit switch 186, wire 675, and normally closed overload contacts 676 to line L—2 so long as the motor continues to rotate in a forward direction. Energization of the operating solenoid 698 of motor control panel 672 connects the motor to the main line in such a manner that it tends to rotate in a reverse direction and instantaneously comes to rest. When the motor comes to rest, the contacts 706 open, breaking the circuit to the operating solenoid 698 of the motor control panel 672. When the motor is rotating in a reverse direction, with the operating solenoid 698 of the motor control panel 672 energized and the main contacts 701, 702 and 703 closed, the normally open contacts 707 of plugger 705 are closed. These contacts are in series with a normally closed set of contacts 710 which close upon disconnecting the motor from the line, establishing a circuit from the wire 589, through the contacts 707, wire 711, contacts 710, wire 670, operating solenoid 671 of motor control panel 672, etc., to the line L—2 so long as the motor continues to rotate. When the motor stops rotating, which is instantaneously, the circuit to the operating solenoid 671 is broken by the opening of the contacts 707 of the plugger 705.

When the selecting switch 449 is turned to its "off" position, the operating circuits to the relays 545 and 636 and the circuit to the indicating light 450 are broken. This, in turn, opens the circuit to the solenoid 112, allowing the movable element 106 of clutch O to return to its neutral or disengaged position under the action of the spring 115, disconnecting the lead screws 118 and 120 from the motor 21. In the event that the movable clutch element 106 of the clutch O does not immediately return to its neutral position upon deenergization of the operating solenoid 112, a circuit is established through the solenoid 81 upon the opening of the relay 545 from the wire 486 through stop push button switch 468, wire 648, contacts 544 of relay 545, wire 546, contacts 547 of relay 548, wire 549, contacts 550 of relay 551, wire 552, normally open switch 153, which switch is now closed, wire 713, and solenoid 81 to line L—2, as long as the switch 153 remains closed. Energization of the solenoid 81 instantaneously pulls the movable clutch element 106 of the clutch to its neutral position, whereupon the switch 153 opens, breaking the circuit to the solenoid 81.

*Saddle*

To move the saddle E the selecting switch 455 is turned to its "on" position. This establishes a circuit from the line L—1 through the wire 486, normally closed contacts 587 of relay 539, wire 588, normally closed contacts 584 of relay 540, wire 589, selecting switch 455, wire 715, operating solenoid 716 of relay 548, wire 717, normally closed contacts 641 of relay 545, wire 718, and normally closed contacts 719 of relay 551 to L—2. At the same time, the operating solenoid 720 of relay 721 and the indicating light 456 are energized as they are connected in parallel with the operating solenoid 716 of relay 548. Energization of the operating solenoid 716 of relay 548 closes the normally open contacts 722 and 723 and opens the normally closed contacts 547, 632, and 724 thereof. Energization of the operating solenoid 720 of relay 721 closes the normally open contacts 725, 726, 727, 728, 729 and 730 thereof. The closing of the contacts 726 of relay 721 establishes a circuit from the wire 715, through the contacts 726, wire 725, and solenoid 64 to L—2. Energization of the solenoid 64 shifts the movable clutch element 57 to engage the clutch M and connect the lead screw 58 with the motor 21.

The saddle E can not be moved horizontally along the ways 12 and 13 by depressing either of the "continuous" push buttons 451 and 452 or either of the "inch" push buttons 453 and 454. Assuming that it is desired to move the saddle continuously towards the left, the continuous left push button 452 is depressed, opening the normally closed contacts and closing the normally open contacts thereof. Closing of the normally open contacts establishes a circuit from the wire 486, through the feed stop push button switch 468, wire 648, contacts 728 of relay 721, wire 733, normally open contacts of push button switch 452, wire 650, operating solenoid 651, relay 652, wire 653, and either normally open contacts 654 or 655 of the motor control panel 495, depending upon the direction of rotation of the main driving motor 23, to line L—2. Energization of the operating solenoid 651 of relay 652 closes the normally open contacts 656, 657, 658, 659 and 660 thereof. The closing of contacts 660 of relay 652 closes a circuit from the wire 715 through the contacts 722 of relay 548, wire 735, transformer 736, wire 737, and contacts 660 to L—2, energizing the indicating light 738 located in the push button 452, which indicating light is connected to the secondary of the transformer 736 by the wires 739 and 740.

The closing of contacts 658 of relay 652 establishes a holding circuit for the relay from the wire 486, through the normally closed contacts of feed stop push button switch 468, wire 648, contacts 729 of relay 721, wire 741, normally closed contacts of push button switch 453, wire 742, normally closed contacts of push button switch 451, wire 669, contacts 658, operating solenoid 651 of relay 652, wire 653, and contacts 654 and 655 of motor control panel 495 to line L—2. This holding circuit maintains the operating solenoid of the relay 652 energized after the push button switch 452 has been released. The closing of contacts 657 of relay 652 completes a circuit from the wire 669, through the contacts 657, wire 670, operating solenoid 671 of motor control panel 672, wire 673, contacts 725 of relay 721, wire 743, normally closed limit switch 198, wire 675, and overload contacts 676 of motor control panel 672 of L—2. Energization of the operating solenoid 671 of the motor control panel 672 closes the main contacts 677, 678 and 679 thereof, connecting the feed and rapid traverse motor 21 to the main line in such a manner that the motor rotates in a direction to move the saddle towards the left.

The motor 21 continues to rotate so long as the holding circuit for the relay 652 is maintained and so long as the limit switch 198 which limits the travel of the saddle towards the left remains closed. Upon the opening of the limit switch 198 or upon depressing the feed stop push button 468, the circuit to the operating solenoid 671 of the motor control panel 672 is broken and the motor 21 disconnected from the line. Opening of the limit switch 198 does not open the holding circuit for the relay 652 but depressing the feed stop push button 468 does. Deenergizing the operating solenoid 651 of the relay 652 opens the primary circuit to the transformer 736 and extinguishes the light 738.

With the selecting switch 455 turned on and the other selecting switches in their "off" position, the saddle E can be inched towards the left by depressing the left hand "inch" push button switch 454. This closes a circuit from the wire 486, through the feed stop push button 468, wire 648, contacts 730 of relay 721, normally open contacts of push button switch 454, wire 670, operating solenoid 671 of motor control panel 672, etc. Energization of the operating solenoid 671 of the motor control panel 672 closes the main contacts 677, 678, and 679 thereof, causing the motor 21 to rotate in the same direction as previously referred to. The motor continues to rotate so long as the "inch" left push button switch 454 is depressed provided the stop push button 468 is not depressed.

With the selecting switch 455 in its "on" position, the saddle E can be moved continuously towards the right by depressing the continuous right push button switch 451. This establishes a circuit from the wire 486, through the normally closed contacts of the feed stop push button switch 468, wire 648, contacts 727 of relay 721, wire 746, normally open contacts of continuous right push button switch 451, wire 681, operating solenoid 682 of relay 683, wire 653, and either contacts 654 or 655 of motor control panel 495 to L—2. Energization of the operating solenoid 682 of relay 683 closes the normally open contacts 684, 685, 686, 687, and 688 thereof, as previously stated. The closing of contacts 685 of relay 683 establishes a circuit from the wire 589, through the selecting switch 455, wire 115, contacts 722 of relay 548, wire 735, transformer 748, wire 749 and contacts 685 to L—2. Energization of transformer 748 energizes the indicating lamp 750 in the continuous right push button switch 451, which lamp is connected to the secondary of the transformer 748 by the wires 740 to 752.

The closing of contacts 687 of relay 683 completes a holding circuit therefor from the wire 486, through the normally closed contacts of stop push button switch 468, wire 648, normally open contacts 730 of relay 721, wire 753, normally closed contacts of "inch" left push button switch 454, wire 754, normally closed contacts of "continuous" left push button switch 452, wire 696, contacts 687, wire 681, operating solenoid 682 of relay 683, wire 653, and contacts 654 or 655 to line L—2. This holding circuit maintains the relay 683 energized after the continuous right stop push button switch 451 has been released. The closing of contacts 686 of relay 683 completes a circuit from wire 696, through contacts 686, wire 697, operating solenoid 698 of motor control panel 672, wire 699, contacts 723 of relay 548, wire 755, limit switch 199, wire 675, and overload contacts 676 of motor control panel 672 to L—2. Energization of the operating solenoid 698 of motor control panel 672 closes the main contacts 701, 702, and 703 thereof, connecting the motor 21 to the line in such a manner that it rotates in a reverse direction, that is, in a direction to move the saddle to the right. The motor continues to operate until the limit switch 199 is opened by the saddle reaching the end of its travel towards the right, or until the feed stop push button switch 468 is depressed. In the event the motor is stopped by the opening of the limit switch 756, the relay 683 remains closed but in the event the motor is stopped by depressing the feed stop push button 468, the holding circuit for the relay 683 is broken and the indicating lamp 750 is extinguished.

The saddle can be inched to the right by depressing the "inch" right push button switch 453 opening the normally closed contacts and closing the normally open contacts thereof. This establishes a circuit from the wire 486, through the normally closed contacts of push button switch 468, wire 648, normally open contacts 729 of relay 721, wire 741, normally open contacts of "inch" right push button switch 453, wire 697, operating solenoid 698 of motor control panel 672, wire 699, normally open contacts 723 of relay 721, wire 755, limit switch 756, wire 675 and normally closed overload contacts 676 of motor control panel 672 to L—2. Energization of the operating solenoid 698 of the motor control panel 672 causes the main contacts 701, 702 and 703 thereof to close, connecting the motor to the line. The motor continues to operate so long as the "inch" right push button switch 453 is depressed sufficiently to hold the normally open contacts thereof closed unless the limit switch 744 is opened.

As previously stated, the spindle 19 must be rotating, otherwise the saddle, etc. cannot be moved. Just as the spindle head and back rest block cannot be rapid traversed unless the feed and rapid traverse motor 21 is rotating, the saddle cannot be rapid traversed unless this motor is rotating. With the motors 21 and 23 rotating, the saddle can be rapid traversed in either direction, depending upon the direction of rotation of the motor 21 by merely depressing the normally open rapid traverse push button switch 467 to close the contacts thereof. This establishes a circuit from the wire 589, through the normally open contacts of the rapid traverse push button switch 467, wire 704, and solenoid 41 to L—2. Energization of the solenoid 41 engages the normally disengaged friction clutch L, causing the lead screw 58 to rotate at a comparatively high rate of speed through the overrunning clutch device K. When the rapid traverse push button switch 467 is released, the solenoid 41 is deenergized and the friction clutch L disengaged, thus stopping the rapid traverse movement of the saddle.

The motor 21 is "plugged" in a manner similar to that described above in connection with movement of the spindle head, except that normally open contacts 639 and 646 of relays 545 and 636, respectively, are interchanged with contacts 723 and 725 of relays 548 and 721, respectively, and limit switches 185 and 186 are interchanged with limit switches 198 and 199. When the motor is rotating in a forward direction, that is, in a direction to move the saddle to the left, the main contacts 677, 678 and 679 are closed and normally closed contacts 708 which operate therewith are open. As soon as the motor 21 is disconnected from the line, the contacts 708 close, completing a circuit from the wire 589, through the contacts 706, wire 709, contacts 708, wire 697, operating solenoid 698 of motor control panel 672, wire 699, normally open contacts 723 of relay 548, wire 755, limit switch 199, wire 675, and normally closed overload contacts 676 to line L—2 so long as the motor continues to rotate in a forward direction. Energization of the operating solenoid 698 of motor control panel 672 connects the motor to the main line in such a manner that it tends to rotate in a reverse direction and instantaneously comes to rest. When the motor comes to rest, the contacts 706 open breaking the circuit to the operating solenoid 698 of the motor control panel 672. When the motor is rotating in a reverse direction, with the operating solenoid 698 of the motor control panel 672 energized and the main contacts 701, 702 and 703 closed, the normally open contacts 707 of plugger 705 are closed. These contacts are in series with a normally closed set of contacts 710 which close upon disconnecting the motor from the line, establishing a circuit from the wire 589, through the contacts 707, wire 711, contacts 710, wire 670, operating solenoid 671 of motor control panel 673, etc., to the line L—2 so long as the motor continues to rotate. When the motor stops rotating, which is instantaneously, the circuit to the operating solenoid 671 is broken by the opening of the contacts 707 of the plugger 705.

When the selecting switch 455 is turned to its "off" position, the operating circuits to the relays 548 and 721 and the circuit to the indicating light 456 are broken. This in turn opens the circuit to the solenoid 64, allowing the clutch M to disengage under the action of the spring 68, disconnecting the lead screw 58 from the motor 21. In the event that the movable clutch element 57 of the clutch M does not immediately return to its neutral position upon deenergization of the operating solenoid 64, a circuit is established through the solenoid 112 upon the opening of the relay 548 from the wire 486 through stop push button switch 468, wire 648, contacts 544 of relay 545, wire 546, contacts 547 of relay 548, wire 549, contacts 550 of relay 551, wire 552, normally open switch 152 which is now closed, wire 647, and solenoid 112 to line L—2, so long as the switch 152 remains closed. Energization of the solenoid 112 instantaneously pulls the movable clutch element 57 of the clutch to its neutral position whereupon the switch 152 opens, breaking the circuit to the solenoid 112.

*Table*

To move the table F the selecting switch 464 is first turned to its "on" position. Assuming that the spindle feed is not operating, and that the selecting switches 449 and 455 are "off" a circuit is established from the line L—1 through the wire 486, normally closed contacts 587 of relay 539, wire 588, normally closed contacts 584 of relay 540, wire 589, selecting switch 464, wire 765, operating solenoid 766 of relay 551, wire 767, normally closed contacts 640 of relay 545, wire 768, and normally closed contacts 724 of relay 548 to L—2. At the same time the operating solenoid 769 of relay 770 and the indicating light 465 are energized as they are connected in parallel with the operating solenoid 766 of relay 551. Energization of the operating solenoid 766 of relay 551 closes the normally open contacts 771, 772, and 773 and opens the normally closed contacts 550, 634 and 719 thereof. Energization of the operating solenoid 769 of relay 770 closes the normally open contacts 774, 775, 776, 777, 778 and 779 thereof. The closing of the contacts 775 of relay 770 establishes a circuit from the wire 765, through the contacts 775, wire 713, and solenoid 81 to L—2. Energization of the solenoid 81 shifts the movable clutch element 80 to engage the clutch N and connect the lead screw 75 with the motor 21.

The table F can now be moved along the saddle E by depressing either of the "continuous" push buttons 460 and 461, or either of the "inch" push buttons 462 and 463. To feed the table F back, the rear "continuous" push button 460 is depressed, opening the normally closed contacts and closing the normally open contacts thereof. Closing of the normally open contacts establishes a circuit from the wire 486, through the feed stop push button switch 468, wire 648, normally closed contacts of switch 157, wire 649, contacts 777 of relay 770, wire 780, normally open contacts of push button switch 460, wire 650, operating solenoid 651, relay 652, wire 653, and either normally open contacts 654 or 655 of the motor control panel 495, depending upon the direction of rotation of the main driving motor 23, to line L—2. Energization of the operating solenoid 651 of relay 652 closes the normally open contacts 656, 657, 658, 659, and 660 thereof. The closing of contacts 659 of relay 652 closes a circuit from the wire 765 through the contacts 771 of relay 551, wire 781, transformer 782, wire 783, and contacts 659 to L—2, energizing the indicating light 784 located in the push button 460, which indicating light is connected to the secondary of the transformer 782 by the wires 785 and 786.

The closing of contacts 658 of relay 652 establishes a holding circuit for the relay from the wire 486, through the normally closed contacts of feed stop push button switch 468, wire 648, contacts 778 of relay 770, wire 787, normally closed contacts of push button switch 463, wire 788, normally closed contacts of push button switch 461, wire 669, contacts 658, operating solenoid 651 of relay 652, wire 653, and contacts 654 and 655 of motor control panel 495 to line L—2. This holding circuit maintains the operating solenoid of the relay 652 energized after the push button switch 460 has been released. The closing of contacts 657 of relay 652 completes a circuit from the wire 669, through the contacts 657, wire 670, operating solenoid 671 of motor control panel 672, wire 673, contacts 774 of relay 770, wire 790, normally closed limit switch 155, wire 675, and overload contacts 676 of motor control panel 672 to L—2. Energization of the operating solenoid 671 of the motor control panel 672 closes the main contacts 677, 678 and 679 thereof, connecting the feed and rapid traverse motor 21 to the main line in such a manner that the motor rotates in a direction to move the table towards the rear.

The motor 21 continues to rotate as long as the holding circuit for the relay 652 is maintained and so long as the limit switch 155 remains closed. Upon the opening of the limit switch 155 or the feed stop push button 468, the circuit to the operating solenoid 671 of the motor control panel 672 is broken and the motor 21 disconnected from the line. Opening of the limit switch 155 does not open the holding circuit for the relay 652 but depressing the feed stop push button 468 does. Deenergizing the operating solenoid 651 of the relay 652 opens the primary circuit to the transformer 782 and extinguishes the light 784. The table F can be inched towards the rear by depressing the "inch" rear push button switch 462. This closes a circuit from the wire 486, through the feed stop push button 468, wire 648, contacts 779 of relay 770, normally open contacts of push button switch 462, wire 670, operating solenoid 671 of motor control panel 672, etc. Energization of the operating solenoid 671 of the motor control panel 672 closes the main contacts 677, 678, and 679 thereof, causing the motor 21 to rotate in the same direction as previously referred to. The motor continues to rotate so long as the "inch" rear push button switch 462 is depressed provided the stop push button 468 is not depressed.

The table F can be moved continuously forward by depressing the front "continuous" push button switch 461. This establishes a circuit from the wire 486, through the normally closed contacts of the feed stop push button switch 468, wire 648, switch 157, wire 649, contacts 776 of relay 770, wire 791, normally open contacts of "continuous" front push button switch 461, wire 681, operating solenoid 682 of relay 683, wire 653, and either contacts 654 or 655 of motor control panel 495 to L—2. Energization of the operating solenoid 682 of relay 683 closes the normally open contacts 684, 685, 686, 687, and 688 thereof. The closing of contacts 684 of relay 683 establishes a circuit from the wire 589, through the selecting switch 464, wire 765, contacts 771 of relay 551, wire 781, transformer 792, wire 793, and contacts 684 to L—2. Energization of transformer 792 energizes the indicating lamp 794 in the "continuous" front push button switch 461, which lamp is connected to the secondary of the transformer 792 by the wires 786 and 796.

The closing of contacts 687 of relay 683 completes a holding circuit therefor from the wire 486, through the normally closed contacts of stop push button switch 468, wire 648, normally open contacts 779 of relay 770, wire 797, normally closed contacts of "inch" front push button switch 462, wire 798, normally closed contacts of "continuous" rear push button switch 460, wire 696, contacts 687, wire 681, operating solenoid 682 of relay 683, wire 653, and contacts 654 or 655 to line L—2. This holding circuit maintains the relay 683 energized after the "continuous" forward push button switch 461 has been released. The closing of contacts 686 of relay 683 completes a circuit from wire 696, through contacts 686, wire 697, operating solenoid 698 of motor control panel 672, wire 699, contacts 772 of relay 551, wire 799, limit switch 156, wire 675, and overload contacts 676 of motor control panel 672 to L—2. Energization of the operating solenoid 698 of motor control panel 672 connects the motor 21 to the line in such a manner that it rotates in a direction to move the table towards the front. The motor continues to operate until the limit switch 156 is opened by the table reaching the end of its travel or until the feed stop push button switch 468 is depressed. In the event the motor is stopped by the opening of the limit switch 156, the relay 683 remains closed but in the event the motor is stopped by depressing the feed stop push button 468, the holding circuit for the relay 683 is broken and the indicating lamp 794 is extinguished.

The table can be inched forward by depressing the "inch" front push button switch 463 closing the normally open contacts thereof. This establishes a circuit from the wire 486, through the normally closed contacts of push button switch 468, wire 648, normally open contacts 778 of relay 770, wire 787, normally open contacts of "inch" front push button switch 463, wire 697, operating solenoid 698 of motor control panel 672, wire 699, normally open contacts 772 of relay 551, wire 799, limit switch 156, wire 675 and normally closed overload contacts 676 of motor control panel 672 to L—2. Energization of the operating solenoid 698 of the motor control panel 672 causes the main contacts 701, 702, and 703 thereof to close, connecting the motor to the line. The motor continues to operate as long as the "inch" front push button switch 463 is depressed sufficiently to hold the normally open contacts thereof closed.

The spindle 19 must be rotated, otherwise the contacts 654 and 655 on the motor control panel 495 are open and the feed and rapid traverse motor 21 cannot be operated. The table F can be rapid traversed in either direction, depending upon the direction of rotation of the motor 21 by merely depressing the normally open rapid traverse push button switch 467 to close the contacts theeof. This establishes a circuit from the wire 589, through the normally open contacts of the rapid traverse push button switch 467, wire 704, and solenoid 41 to L—2. Energization of the solenoid 41 engages the normally disengaged friction clutch L, causing the lead screw 75 to be rotated at a comparatively high rate of speed through the overrunning clutch device K. When the rapid traverse push button switch 467 is released, the solenoid 41 is deenergized and the friction clutch L disengaged, thus stopping the rapid traverse movement of the table.

Provision is also made for automatically moving the table F under rapid traverse while it is being fed in either direction. This is accomplished by means of the switch 157, the position of which is controlled by trips carried by the table adapted to engage the upper end of a lever 166 which in turn actuates the switch 157. The normally open set of contacts of the switch 157 upon being closed establishes a circuit from the wire 589 through the normally open contacts 773 of relay 551, wire 795, normally open contacts of switch 157, wire 704, solenoid 41, and wire 559 to L—2. Energization of the solenoid 41 causes the rapid traverse to operate in a manner heretofore referred to, causing the table to be rapid traversed in the direction in which it is feeding until the switch 157 is restored to its original position. When the switch 157 is actuated to close the normally open contacts thereof the normally closed contacts open. These contacts are so interlocked with the table control, that when they open the "continuous" push button switches 451 and 452 are inoperative. As shown, the switch 157 is adapted to be moved from its normal position shown in the wiring diagram to open the normally closed contacts thereof and close the normally open contacts thereof by the engagement of the cam surface 172 on the adjustable trip 173 with the end of the lever 166 and is adapted to be moved back to its normal position by the cam surfaces 168 on one of the adjustable trips 161, 162 or 169. It will be readily apparent that any sequence of feed movements and rapid traverse movements may be imparted to the table F by selecting the proper arrangement of adjustable trips 161, 162, 169, 173, etc.

Depressing the stop push button switch 468 while the table is operating in rapid traverse, breaks the holding-in circuit for whichever of the operating solenoids of the motor control panel 672 is energized depending upon the direction of rotation of the motor. This stops the table movement but the normally closed contacts of the switch 157 remain open and the switch 157 must be reset by means of the manual lever 174 before the machine can be started again by either of the continuous push button switches 460 and 461, thus preventing the table from starting up in rapid traverse upon either of the continuous feed push button switches 460 or 461 being depressed. The fact that the normally open contacts 773 of relay 551 are in series circuit with the normally open contacts of the switch 157 prevents any possibility of the table being moved unless the selecting switch 449 is in its "on" position.

When operating the table F, the motor 21 is "plugged" in a manner similar to that described above with reference to movements of the spindle head and saddle except that the normally open contacts 772 and 774 of relays 551 and 770, respectively, replace the corresponding contacts of relays 545, 636, and 548, 721, respectively, and the limit switches 155 and 156 replace the limit switches 186, 185, and 198, 199, respectively. When the motor is rotating in a forward direction, that is, in a direction to move the table towards the rear, the main contacts 677, 678 and 679 are closed and normally closed contacts 708 which operate therewith are open. As soon as the motor 21 is disconnected from the line, the contacts 708 close, completing a circuit from the wire 589, through the contacts 706 of "plugger" 705, wire 709, contacts 708, wire 697, operating solenoid 698 of motor control panel 672, wire 699, normally open contacts 772 of relay 551, wire 799, limit switch 156, wire 675, and normally closed overload contacts 676 to line L—2 so long as the motor continues to rotate in a forward direction. Energization of the operating solenoid 698 of motor control panel 672 connects the motor to the main line in such a manner that it tends to rotate in a reverse direction and instantaneously comes to rest. When the motor comes to rest, the contacts 706 open breaking the circuit to the operating solenoid 698 of the motor control panel 672. When the motor is rotating in a reverse direction, with the operating solenoid 698 of the motor control panel 672 energized and the main contacts 701, 702 and 703 closed, the normally open contacts 707 of plugger 705 are closed. These contacts are in series with a normally closed set of contacts 710 which close upon disconnecting the motor from the line, establishing a circuit from the wire 589, through the contacts 707 of "plugger" 705, wire 711, contacts 710, wire 670, operating solenoid 671 of motor control panel 672, etc., to the line L—2 so long as the motor continues to rotate. When the motor stops rotating, which is instantaneously, the circuit to the operating solenoid 671 is broken by the opening of the contacts 707 of the plugger 705.

When the selecting switch 464 is turned to its "off" position, the operating circuits to the relays 551 and 770 and the circuit to the indicating light 465 are broken. This in turn opens the circuit to the solenoid 81, allowing the clutch N to disengage under the action of the springs 89, disconnecting the lead screw 75 from the motor 21. In the event that the movable clutch element 80 of the clutch N does not immediately return to its neutral position upon deenergization of the operating solenoid 81, a circuit is established through the solenoid 112 upon the opening of the relay 551 from the wire 486 through contacts 544 of relay 545, wire 546, contacts 547 of relay 548, wire 549, contacts 550 of relay 551, wire 552, normally open switch 154, wire 647, and solenoid 112 to line L—2, as long as the switch 154 remains closed. Energization of the solenoid 112 instantaneously pulls the movable clutch element 80 of the clutch to its neutral position whereupon the switch 154 opens, breaking the circuit to the solenoid 112.

As previously stated, the rapid traverse and feed motor 21 can be jogged as well as the main motor 23 by the jog push button switch 466 located on the frame of the machine. Depressing this switch to open the normally closed contacts thereof and close the normally open contacts thereof establishes a circuit from the line L—1 through the wire 485, normally open contacts of jog push button switch 466, wire 521, operating solenoid 522 of relay 523, and wire 524 to L—2. Energization of the operating solenoid 522 of relay 523 closes the normally open contacts 525 thereof causing the main motor 23 to rotate in a manner heretofore described. Closing of the normally open contacts 526 of relay 523 establishes a circuit from the line L—1 through the wire 485, normally open contacts of jog push button switch 466, wire 521, contacts 526, wire 697, operating solenoid 698 of motor control panel 672, wire 699, normally open contacts 527 of relay 523, which contacts are now closed, wire 675, and overload contacts 676 to line L—2. Energization of the operating solenoid 698 of motor control panel 672 connects the motor 21 to the main line, causing it to rotate as long as the normally open contacts of jog push button switch 466 are maintained closed.

Backrest block clamp

The backrest block G is adapted to be clamped and unclamped to the backrest column D simultaneously with the clamping and unclamping of the spindle head C to the spindle head column B. When the clamping lever 391 is rotated in a clockwise direction to clamp the spindle head C to the column B, the normally open switch 406 is closed thereby. This establishes a circuit from the line L—1 through the wire 485, normally closed contacts of jog push button switch 466, wire 486, switch 406, wire 800, operating solenoid 801 of the motor control panel 627, and wire 559 to L—2. Energization of the operating solenoid 801 of motor control panel 627 closes the normally open contacts 802, 803 and 804, connecting the clamp motor 400 to the line in such a manner that it rotates in a direction to clamp the backrest block G to the column D. Energization of the operating solenoid 801 of motor control panel 627 also opens the normally closed contacts 626 and 805 thereof. The contacts 626 are connected in series with the spindle head and backrest block selecting switch 449 and the opening of these contacts prevents movement of the spindle head or backrest block while the same are clamped to the ways.

To unclamp the spindle head C from the column B and the backrest block G from the column D, the clamp lever 391 is rotated in a counter-clockwise direction, opening the switch 406, deenergizing the operating solenond 801 of motor control panel 627. This establishes a circuit from the line L—1 through wire 485, normally closed contacts of jog push button switch 466, wire 486, normally closed contacts 805 of motor control panel 627, which contacts are now closed, wire 806, operating solenoid 807 of motor control panel 627, wire 800, switch 407, and wire 559 to L—2. Energization of the operating solenoid 807 of motor control panel 627 closes the main contacts 809, 810 and 811 thereof, connecting the motor 400 to the main line in such a manner that it rotates in a reverse direction, that is, in a direction to unclamp the backrest block G from the column D. When the backrest block G is unclamped, the circuit to the operating solenoid 807 of motor control panel 627 is broken by the opening of limit switch 407. With the spindle head and the backrest block free to move vertically along the columns B and D, respectively, the feed and rapid traverse motor 21 can be operated since the contacts 626 of motor control panel 627, which contacts are in series with the selecting switch 449, are now closed.

Backrest column

According to the provisions of the present invention, the backrest column D can be moved along the horizontal ways 12 and 13 of the bed A by an electric motor 409 secured to the rear side of the backrest base 415 and operatively connected to the saddle lead screw 58 in a manner heretofore referred to. The motor 409 is adapted to be controlled by two push button switches 416 and 417 located underneath the backrest column clamp lever 418. The construction is such that the switches cannot be operated unless the backrest column clamp lever is in a position to unclamp the column from the ways. Depressing the switch 416 establishes a circuit from the line L—1 through the wire 485, normally closed contacts of jog push button switch 466, wire 486, normally open contacts of switch 416, wire 812, operating solenoid 813 of motor control panel 814, wire 815, normally closed overload contacts 816, wire 817, and normally closed overload contacts 818 and wire 559 to line L—2. Energization of the operating solenoid 813 of motor control panel 814 closes the main contacts 820, 821, 822, connecting the motor 409 to the main line in such a manner that the motor is rotated in a direction to move the backrest column G towards the left. When the push button switch 416 is released, the circuit to the solenoid 813 is broken and the motor stopped. The backrest column D is moved in a reverse direction by depressing the normally open push button switch 417. This establishes a circuit from the line L—1 through the wire 485, normally closed contacts of jog push button switch 466, wire 486, push button switch 417, wire 822, operating solenoid 823 of motor control panel 814, overload contacts 816, wire 817, overload contacts 818, and wire 559 to L—2. Energization of the operating solenoid 823 of motor control panel 814 closes the main contacts 824, 825 and 826 thereof connecting the motor 409 to the line in such a manner that it rotates in a reverse direction. When the push button switch 417 is released, the circuit to the operating solenoid 823 of motor control panel 814 is broken, allowing the main contacts 824, 825 and 826 of the motor control panel to open, thus stopping the motor.

From the foregoing description of the preferred embodiment of the invention, it will be apparent that the objects of the invention heretofore enumerated and others have been attained and that a new and improved machine of the character described has been provided. All movements of the spindle head, table, and saddle are controlled from the electrical control pendant which can be swung, raised or lowered to be readily within the operator's reach from any position he may be required to be in for the operation he is doing. This control station is so arranged that when the operator has become familiar with the relative locations of the various push buttons and selector switches, he can control any movement or adjustment by touch without taking his eyes off of the work or cutting tool.

Full directional control of the vertical, cross, and longitudinal motions of the various units by corresponding arrangement of the push buttons on the front and side of the pendant control station makes obvious the direction of the motion control. Indicating lights show the unit selected for movement and interlocks cut out all other units. Automatic limit switches stop all motions of the various units in both directions, thus preventing over travel with consequent assurance against damage. Merely engaging the electrical control for motion in the opposite direction backs any unit off of its limit switch. The large graduated dial on the front of the spindle head indicates the spindle position in or out and serves over the entire range of the spindle travel as a depth gauge. The direction reading dial is supplemented by an adjustable micrometer dial. The adjustable dial adjacent to the large dial can be set to trip the spindle feed electrically at any desired distance within its range of travel.

The table is provided with an automatic cycle of alternate feed and rapid traverse which may be readily set up by adjustable trips for milling interrupted surfaces, etc. The speed and feed change gear boxes are located in a stationary position in the bed where they do not have to be counterbalanced and dual control is provided for shifting the speed and change gears either from floor level adjacent to the bed of the machine or at the spindle head which may be high up on the column. The spindle feed mechanism is driven directly from the spindle, which is a decided advantage. Means for supporting the end measures is incorporated in the machine which facilitates the use of dial indicators. A V-shaped groove is planed in the left side of the saddle to support length gauges. A readily visible graduated scale for approximate vertical settings of the spindle head is mounted on the front face of the vertical shaft or rod which carries the dial indicator and another scale is provided at the left side of the table for approximate cross settings of the table. The backrest block is clamped to the backrest block column electrically by remote control through a switch operated simultaneously with the lever which clamps the spindle head to both ways of the spindle head column. Interlocks prevent vertical movement of the spindle head and backrest block while clamped.

While the preferred embodiment of the invention has been described with considerable detail, we do not wish to be limited to the particular construction which may be varied within the scope of this invention and it is our intention to hereby cover all adaptations, modifications and variations which come within the practice of those skilled in the art to which the invention relates.

Having thus described our invention what we claim is:

1. In a machine tool of the character referred to, the combination of a frame, a member movable supported by said frame, means for moving said member, a pendant control station supported on said frame for movement in both horizontal and vertical directions, means for yieldably resisting the movement of the pendant control station in a vertical direction, and manually operable electric switches on said control station for controlling the operation of the first-named means.

2. In a machine tool of the character referred to, the combination of a frame, a member movably supported by said frame for linear movement, means for reciprocating said member, a pendant control station having a face or panel lying in a plane parallel with the path of movement of said member, means for supporting said pendant control station for universal movement, means for restricting the free movement of said pendant control station in a vertical plane, means for maintaining the face or panel of said control station in a plane parallel to the path of movement of said member irrespective of the position to which the pendant control station is moved, and manually operable electric switches on said control station for controlling the first-named means.

3. In a machine tool of the character referred to, the combination of a frame, a member movably supported on said frame, a reversible electric motor for moving said member, a pendant control station having a face or panel lying in a plane parallel to the path of movement of said member, means for supporting said control station on said frame for universal movement, means for yieldably resisting the movement of said pendant control station in a vertical plane, means for maintaining the face or panel of said control station in a plane parallel to the path of movement of said member irrespective of the position to which the pendant control station is moved, and manually operable electric switches on said control station for controlling the operation of said motor.

4. In a machine tool of the character referred to, the combination of a frame, a member movably supported by said frame for linear movement, electrically-controlled means for reciprocating said member, a control station having a face or panel lying in a plane parallel to the path of movement of said member, a manually operable electric switch located on said face or panel of said control station for actuating said means to move said member in one direction, and a manually operable electric switch located on said face or panel of said control station for actuating said means to move said member in the opposite direction, the position of said switches on said face or panel of said control station relative to each other being in the direction of movement initiated thereby.

5. In a machine tool of the character referred to, the combination of a frame, a member movably supported by said frame for linear movement, means for reciprocating said member, a pendant control station having a face or panel lying in a plane parallel to the path of movement of said member, means for supporting said pendant control station on said frame for universal movement, means for maintaining the face or panel of said pendant control station in a plane parallel to the path of movement of said member irrespective of the position to which the pendant control station is moved, a manually operable electric switch located on said face or panel of said pendant control station for actuating the first-named means to move said member in one direction, and a manually operable electric switch located on said face or panel of said pendant control station for actuating the first-named means to move said member in the opposite direction, the position of said switches on said face or panel of said pendant control station relative to each other being in the direction of movement initiated thereby.

6. In a machine tool of the character referred to, the combination of a frame, a member movably supported by said frame for linear movement, electrically-controlled means for reciprocating said member, a control station having a face or panel lying in a plane parallel to the path of movement of said member, a manually operable electric switch located on said face or panel of said control station adjacent to the right-hand side thereof for actuating said means to move said member towards the right, and a manually operable electric switch located on said face or panel of said control station adjacent to the left-hand side thereof for actuating said means to move said member toward the left.

7. In a machine tool of the character referred to, the combination of a frame, a member supported by said frame for linear movement longitudinally of said frame, means for reciprocating said member, a second member supported by said frame for linear movement transversely of said frame, means for reciprocating said second member, a control station having a front face or panel lying in a plane parallel to the longitudinal movement of the first-mentioned member and a side face or panel lying in a plane parallel to the transverse movement of the second-mentioned member, manually operable electric switches located on the front face or panel of said control station for controlling the movement of the first-mentioned means, manually operable electric switches located on the side face or panel of said control station for controlling the movement of the second-mentioned means, the position of said switches on both of said faces or panels of said control station relative to each other being in the direction of movement initiated thereby.

8. In a machine tool of the character referred to, the combination of a frame, a member movably supported by said frame for linear vertical movement, electrically controlled means for reciprocating said member, a control station having a vertical face or panel, a manually operable electric switch located on said vertical face or panel of said control station for actuating said means to move said member in an upward direction, and a manually operable electric switch located on said vertical face or panel of said control station below the first-mentioned switch for actuating said means to move said member in a downward direction.

9. In a machine tool of the character referred to, the combination of a bed, a vertical column adjacent to one end of said bed, a saddle member movably supported on said bed, a table member movably supported on said saddle member, a spindle head movably supported on said vertical column, means including a reversible electric motor for moving said members, means for selectively connecting said members to said electric motor, and mechanical means operatively connected to said last-named means for preventing the connection of more than one of said members to said electric motor simultaneously.

10. In a machine tool of the character referred to, the combination of a frame, a plurality of members supported thereon for linear movement, a reversible electric motor, electrically controlled means for selectively connecting said members to said electric motor, and electrically controlled means for preventing the connection of more than one of said members to said electric motor simultaneously.

11. In a machine tool or the like, the combination of a supporting member, a second member movably supported thereby, resilient means continuously urging said second member to a first position, a solenoid for shifting said second member to a second position, a second solenoid for shifting said second member to a third position, and means for automatically energizing one of said solenoids upon the deenergization of the other of said solenoids until said second member is returned to its intermediate position.

12. In a machine tool of the character referred to, the combination of a frame having a vertical column adjacent to one end thereof, a saddle member movably supported by said frame, a table member movable on said saddle member, a spindle head member movable along said column, a spindle member slidably supported in said spindle head member for axial movement, means for moving one of said members, said means comprising a driven shaft and two driving members coaxially arranged with respect thereto, a drive sleeve on said shaft, clutch teeth for detachably clutching one of said driving members with said sleeve, cam teeth causing the other of said driving members to turn continuously with said sleeve, said cam teeth being effective to automatically declutch the first of said driving members from said sleeve when the second of said driving members has drive imparted thereto, and spring means normally tending to cause clutch of the first-mentioned of said drive members with said sleeve.

13. In a machine tool or the like, the combination of a movable member, resilient means continuously urging said member to a first position, a solenoid for moving said member to a second position, a second solenoid for moving said member to a third position, said first position being intermediate said second and third positions, means for selectively energizing said solenoids, means for automatically energizing one of said solenoids upon the deenergization of the other of said solenoids, and means for deenergizing the second energized solenoid upon return of said member to its first position.

14. In a machine tool or the like, the combination of a movable member, means including a reversing clutch having an intermediate neutral position and two engaged positions for moving said member in opposite directions, resilient means for continuously urging said reversing clutch into its intermediate neutral position, an electric solenoid for moving said clutch into one of its engaged positions to move said member in one direction, a second solenoid for moving said clutch into the other of its engaged positions to move said member in the reverse direction, and means for energizing one of said solenoids upon the deenergization of the other of said solenoids and means for deenergizing the second energized solenoid upon return of said clutch to its intermediate neutral position.

15. In a machine tool or the like, the combination of a frame, a first member movably supported thereby, resilient means continuously urging said first member to a first position, a solenoid for moving said first member to a second position, a second member supported by said frame, resilient means continuously urging said second member to a second position, means for selectively energizing said solenoids, means for automatically energizing either of said solenoids upon the deenergization of the other of said solenoids, and means for deenergizing the last of said solenoids to be energized upon return of said member actuated by the first of said solenoids to be energized to its first position.

16. In a machine tool of the character referred to, the combination of a frame, a member movably supported by said frame, driving means, means including a reversing clutch for operatively connecting said member to said driving means, said reversing clutch having an intermediate neutral position and two engaged positions, resilient means for continuously urging said reversing clutch into its intermediate neutral position, an electric solenoid for moving said clutch into one of its engaged positions, a second solenoid for moving said clutch into the other of its engaged positions, a manually operable switch having a plurality of positions adapted when in one position to cause said solenoids when energized to actuate said clutch to move said member in a predetermined direction irrespective of the direction of rotation of said driving means.

17. In a machine tool of the character referred to, the combination of a frame comprising a base and a vertical column, a spindle head supported for vertical movement along said column, a spindle rotatably supported in said spindle head, electrically controlled means for moving said spindle head, said last-mentioned means including limit switches carried by said spindle head, a stationary vertical splined shaft having one spline removed and replaced by a vertical scale, means for supporting said vertical splined shaft adjacent to said spindle head, adjustable trips for actuating said limit switches supported on the rear splines of said vertical splined shaft, a dial indicator adjustably supported on the front splines of said vertical splined shaft, means adjustably secured to the front splines of said vertical splined shaft for supporting an index rod, and an anvil for an index rod carried by said spindle head.

18. In a horizontal boring and milling machine of the character referred to, the combination of a bed, a vertical column adjacent to one end of said bed, a saddle slidably supported on said bed, a table slidably supported on said saddle, a spindle head supported for vertical movement along said vertical column, a spindle slidably and rotatably supported in said spindle head, means for moving said spindle lengthwise, and a cooperating dial and reference line operatively connected to said spindle and to said spindle head, one relative rotation between said dial and said reference line representing the full travel of said spindle.

19. In a machine tool of the character referred to, the combination of a bed, a vertical column adjacent to one end of said bed, a saddle movably supported on said bed, a table movably supported on said saddle, a spindle head slidably supported for vertical movement along said vertical column, a spindle rotatably and slidably supported in said spindle head, electrically controlled means for reciprocating said spindle, a dial permanently connected with said spindle in such a manner that one rotation of the dial represents the full travel of the spindle, an adjustable dial adapted to be operatively connected to said spindle, and means carried by said adjustable dial for stopping the movement of said spindle.

20. In a machine tool of the character referred to, the combination of a frame having a plurality of ways thereon, a first member movable along said ways, and means for clamping said first member to said ways, said means comprising a plurality of pairs of members rotatably supported by said first member for rotation about axes extending generally longitudinally of the ways, one member of each of said pairs of members being a clamp member and the other a lever member, said clamp member being engageable with said frame at the rear of said ways and said lever being located at the other side of said ways, individual links extending generally normal to said ways for operatively connecting the members of each pair of said pairs of members together, and means operatively connected to said lever members for rotating the same about their pivots to clamp the first-mentioned member to said frame.

21. In a machine tool of the character referred to, the combination of a frame having a plurality of ways thereon, a first member movable along said ways, and means for clamping said first member to said ways, said means comprising a plurality of pairs of members rotatably supported by said first member for rotation about axes extending generally longitudinally of the ways, one member of each of said pairs of members being a clamp member and the other a lever member, said clamp member being engageable with said frame at the rear of said ways and said lever being located at the other side of said ways, individual links extending generally normal to said ways for operatively connecting the members of each pair of said pairs of members together, a plurality of slidable members carried by said first member and extending generally transversely of said ways, each of said slidable members engaging one of said lever members of said pairs of members, a second member, links operatively connecting adjacent ends of said slidable members to opposite ends of said second member, and means for moving said second member in a direction generally normal to said ways.

22. In a machine tool of the character referred to, the combination of a frame comprising a spindle head column and a backrest column, a spindle head slidably supported on said spindle head column, a backrest block slidably supported on said backrest column, clamp means for clamping said spindle head to said spindle head column, clamp means for clamping said backrest block to said backrest column, and means for simultaneously actuating said clamp means to clamp and unclamp said spindle head and backrest block to the spindle head column and the backrest column respectively.

23. In a machine tool of the character referred to, the combination of a frame comprising a spindle head column and a backrest column, a spindle head slidably supported on said spindle head column, a backrest block slidably supported on said backrest column, clamp means for clamping said spindle head to said spindle head column, electrically-operated clamp means for clamping said backrest block to said backrest column, and means for simultaneously actuating said clamp means to clamp and unclamp said spindle head and said backrest block to said spindle head column and said backrest block column respectively.

24. In a machine tool of the character referred to, the combination of a frame comprising a spindle head column and a backrest column, a spindle head slidably supported on said spindle head column, a backrest block slidably supported on said backrest column, manually operable clamp means for clamping said spindle head to said spindle head column, electrically-operated clamp means for clamping said backrest block to said backrest column, and means for simultaneously actuating said clamp means to clamp and unclamp said spindle head and said backrest block to said spindle head column and said backrest block column respectively.

25. In a machine tool of the character referred to, the combination of a frame, a spindle rotatably and slidably supported by said frame, means for rotating said spindle, means for reciprocating said spindle, and electrically controlled means for operatively connecting said means for rotating said spindle with said means for reciprocating said spindle.

26. In a machine tool of the character referred to, the combination of a frame, a spindle rotatably and slidably supported by said frame, means for rotating said spindle, means for reciprocating said spindle, and electrically controlled means for operatively connecting said means for rotating said spindle with said means for reciprocating said spindle, said last-mentioned means comprising a manually operable switch having a plurality of on positions corresponding with different directions of axial movement of said spindle.

27. In a machine tool of the character referred to, the combination of a frame, a spindle rotatably and slidably supported by said frame, means for rotating said spindle, electrically controlled means adapted to operatively connect said last-mentioned means and said spindle for moving said spindle axially, the last-mentioned means comprising a control station having a face or panel lying in a plane parallel to the axis of rotation of said spindle, and a manually operable switch having a plurality of on positions corresponding with different directions of axial movement of said spindle, said switch being located on said face or panel of said control station and adapted when in either position to cause the spindle when moved axially to move in the direction in which the switch points.

28. In a machine tool of the character referred to, the combination of a frame, a spindle rotatably and slidably supported by said frame, means for rotating said spindle, electrically-controlled means actuated by the rotation of said spindle for reciprocating said spindle, said last-mentioned means comprising two members rotatable in opposite directions adapted to be connected to a shaft by a shiftable member, a solenoid for shifting said member in one direction, a second solenoid for shifting said member in the opposite direction, a manually operable switch having a plurality of positions adapted when in one position to cause said solenoids when energized to position said shiftable member to feed said spindle in a predetermined direction irrespective of the direction of rotation of said spindle and adapted when in another position to energize said solenoids to feed said spindle in the opposite direction irrespective of the direction of rotation of the spindle.

29. In a machine tool of the character referred to, the combination of a frame, a control station, a member supported by said frame for linear movement thereon, means for reciprocating said member comprising a group of manually operable switches located on said control station for controlling the actuation thereof, a second member supported by said frame for linear movement thereon, means for reciprocating said second member comprising a group of manually operable switches located on said control station for controlling the actuation thereof, and selecting switches on said control station one for each of said means, each of said selecting switches when in its on position rendering the control switches associated therewith operative and the other of said selecting switches inoperative.

30. In a machine tool of the character referred to, the combination of a frame, a control station, a member supported by said frame for linear movement thereon, means for reciprocating said member comprising a plurality of manually openable switches located on said control station for controlling the actuation thereof, a second member supported by said frame for linear movement thereon, means for reciprocating said second member comprising a plurality of manually operable switches located on said control station for controlling the actuation thereof, selecting switches on said control station one for each of said means, each of said selecting switches when in its on position rendering the control switches associated therewith operative and the other of said selecting switches inoperative, and a pilot light for each of said selecting switches adapted to be energized when the selecting switch corresponding therewith is positioned to render the control switches associated therewith operative.

31. In a machine tool of the character referred to, the combination of a frame, a member supported by said frame for linear movement longitudinally of said frame, means for reciprocating said member, a second member supported by said frame for linear movement transversely of said frame, means for reciprocating said member, a control station, a plurality of manually operable switches located on said control station for controlling the actuation of the first-mentioned means, a plurality of manually operable switches located on said control station for controlling the second-mentioned means, and selecting switches on said control station one for each of said means, said selecting switches when in their on positions rendering the control switches associated therewith operative and the other selecting switch inoperative.

32. In a machine tool of the character referred to, the combination of a bed having a vertical column adjacent to one end thereof, a saddle supported on said bed, means for reciprocating said saddle, a table supported on said saddle, means for reciprocating said table, a spindle head movable vertically along said column, means for reciprocating said spindle head, a control station, a group of manually operable switches located on said control station for controlling the actuation of the first-mentioned means, a group of manually operable switches located on said control station for controlling the second-mentioned means, a group of manually operable switches located on said control station for controlling the third-mentioned means, and selecting switches on said control station one for each of said groups of switches, each of said selecting switches when in its on position rendering the group of control switches associated therewith operative and the other selecting switches inoperative.

33. In a machine tool of the character referred to, the combination of a frame including a base and a vertical column, a member supported for vertical movement along said column, a spindle rotatably supported in said member, a second member slidably supported on said base, means for feeding one of said members relative to said frame, said means including a feed change speed transmission located in said base and including a shiftable element, means adjacent to said base for moving said shiftable element, and means on said spindle head for moving said shiftable element.

34. In a machine of the character referred to, the combination of a bed, a vertical column adjacent to one end of said bed, a saddle member movably supported on said bed, a table member movably supported on said saddle member, a spindle head member movably supported on said vertical column, a spindle member rotatably supported in said spindle head member and movable axially therein, a reversible electric motor for moving one of said members, means for connecting said electric motor with a source of power for rotation in one direction, means for connecting said electric motor with the source of power for rotation in the reverse direction, and means for automatically actuating the second-mentioned means upon the first-mentioned means being rendered inoperative until the motor substantially comes to rest.

35. In a machine tool of the character referred to, the combination of a frame comprising a base and a vertical column, a spindle head supported for vertical movement along said column, a spindle rotatably supported in said spindle head, electrically-controlled means for moving said spindle head, said last-mentioned means including limit switches carried by said spindle head, a vertical splined shaft supported in said frame adjacent to said spindle head, adjustable trips for said limit switches supported on the splines of said vertical splined shaft.

36. In a machine of the character referred to, the combination of a frame including a base and a vertical column, a spindle head slidably supported for vertical movement along said column, a spindle rotatably supported in said spindle head, an anvil for an index rod carried by said spindle head, a stationary vertical splined shaft supported by said frame adjacent to said spindle head, a dial indicator adjustably supported on the front splines of said vertical splined shaft, and means adjustably secured to the front splines of said vertical splined shaft for supporting an index rod.

37. In a machine of the character described, the combination of a bed, a vertical column adjacent to one end of said bed, a saddle member movably supported on said bed, a table member movably supported on said saddle member, a spindle head member movably supported on said vertical column, a spindle member rotatably supported in said spindle head member and movable axially therein, an electric motor, means for operatively connecting said electric motor to one of said members, said means including a change feed transmission the output shaft of which always rotates slower than the input shaft thereof.

38. In a machine tool of the character referred to, the combination of a frame, a member movably supported by said frame, an electric motor for moving said member, means for controlling the actuation of said electric motor, said means comprising a control station having a push button switch for initiating the operation of said motor and a holding circuit for maintaining the operation thereof, and a pilot light in the push button of said push button switch adapted to be energized while said holding circuit is closed.

39. In a horizontal boring and milling machine of the character referred to, the combination of a bed having a vertical column adjacent to one end thereof, a saddle member slidably supported on said bed, a table member slidably supported on said saddle member, a spindle head member supported for vertical movement along said vertical column a spindle rotatably supported in said spindle head member, an electric motor for rotating said spindle, a control circuit for said electric motor, a second electric motor for moving one of said members, a control circuit for said second electric motor, and an interlock between said control circuits whereby the second-mentioned control circuit is inoperative until the first-mentioned control circuit is closed.

40. In a machine tool, the combination of a frame having a plurality of ways thereon, a member slidably supported for movement along said ways, clamp means for clamping said member to said blades said clamp means comprising cooperating threaded members, a reversible electric motor for producing relative rotation between said threaded members in opposite directions to engaging and disengaging said clamp means, and a control circuit for controlling the actuation of said motor, said control circuit including a manually controlled circuit maker and breaker located at a position remote from said motor.

41. A machine tool comprising, in combination, a plurality of separately movable machine tool elements including a power rotatable cutter spindle, a plurality of power actuated mechanisms connected in driving relation with various ones of said elements, a combined emergency-stop and spindle jog control device, means responsive to a momentary actuation of said device for stopping all of said power actuated mechanisms then operating, and means responsive to a sustained actuation of said device for restarting the drive mechanism associated with said spindle and maintaining the same in operation throughout the period of actuation of said device for jogging said spindle.

42. A machine tool having, in combination, a plurality of independently movable machine tool elements, power actuators for driving said elements individually, a manually operable control device, and mechanism operable in response to sustained actuation of said device to control one of said actuators and cause jogging of one of said elements thereby and in response to momentary actuation of the device to stop all of said actuators.

HENRY M. LUCAS.
HALLIS N. STEPHAN.